(12) United States Patent
Dubinsky

(10) Patent No.: US 9,408,369 B2
(45) Date of Patent: Aug. 9, 2016

(54) DEVICE, SYSTEM AND METHOD FOR LIVESTOCK FEEDING

(71) Applicant: KAI-ZEN ROBOTIC FEEDING (2013) LTD., Kiryat Arba (IL)

(72) Inventor: Ziv Dubinsky, Ramat Hahayal (IL)

(73) Assignee: KAI-ZEN ROBOTIC FEEDING (2013) LTD., Kiryat Arba (IL)

( * ) Notice: Subject to any disclaimer, the term of this patent is extended or adjusted under 35 U.S.C. 154(b) by 518 days.

(21) Appl. No.: 13/952,740

(22) Filed: Jul. 29, 2013

(65) Prior Publication Data

US 2013/0305994 A1 Nov. 21, 2013

Related U.S. Application Data

(63) Continuation-in-part of application No. PCT/IB2012/050443, filed on Jan. 31, 2012, and a continuation-in-part of application No. 13/017,055, filed on Jan. 31, 2011, now abandoned.

(60) Provisional application No. 61/300,187, filed on Feb. 1, 2010.

(51) Int. Cl.
*A01K 5/02* (2006.01)
*A01K 39/012* (2006.01)

(52) U.S. Cl.
CPC .............. *A01K 5/0291* (2013.01); *A01K 5/02* (2013.01); *A01K 5/0275* (2013.01); *A01K 39/0125* (2013.01)

(58) Field of Classification Search
CPC . A01K 39/0125; A01K 5/0266; A01K 39/01; A01K 39/012; A01K 5/02; A01K 5/0283
USPC .......... 119/51.02, 57.3, 57.4, 51.11, 53, 56.1, 119/57.2, 57.5, 57.6, 57.7, 57.92
See application file for complete search history.

(56) References Cited

U.S. PATENT DOCUMENTS

| | | | |
|---|---|---|---|
| 1,684,334 | A | 9/1928 | Toope |
| 3,415,228 | A | 12/1968 | Myers |
| 3,971,340 | A | 7/1976 | Allen |
| 4,235,200 | A | 11/1980 | Shay |

(Continued)

FOREIGN PATENT DOCUMENTS

| | | |
|---|---|---|
| AU | 630682 | 4/1990 |
| DE | 1816597 | 6/1970 |

(Continued)

OTHER PUBLICATIONS

Sakomura, N. K., et al. "Growth curves and body nutrients deposition on two broiler chickens strains." EPC 2006-12th European Poultry Conference, Verona, Italy, Sep. 10-14, 2006. World's Poultry Science Association (WPSA), 2006.
Sakomura, N. K., et al. "Modeling energy utilization and growth parameter description for broiler chickens." Poultry Science 84.9 (2005): 1363-1369.
Marcato, S. M., et al. "Growth and body nutrient deposition of two broiler commercial genetic lines." Revista Brasileira de Ciência Avicola 10.2 (2008): 117-123.

(Continued)

*Primary Examiner* — Yvonne Abbott-Lewis
(74) *Attorney, Agent, or Firm* — Graeser Associates International Inc; Dvorah Graesar

(57) ABSTRACT

The present invention relates to a device, system and a method for livestock feeding, and in particular, to such a device, system and method in which, the meal size and frequency of meal delivery are controllable based on measurable parameters and expected livestock growth curve and real time parameters.

20 Claims, 16 Drawing Sheets

(56) References Cited

U.S. PATENT DOCUMENTS

| | | | |
|---|---|---|---|
| 4,355,596 A * | 10/1982 | Peppler | A01K 39/01 119/457 |
| 4,712,511 A * | 12/1987 | Zamzow | A01K 5/0266 119/51.02 |
| 4,878,455 A * | 11/1989 | van der Veer | A01K 39/0125 119/57.5 |
| 5,069,165 A * | 12/1991 | Rousseau | A01K 5/0266 119/51.02 |
| 5,724,912 A * | 3/1998 | Cull | A01K 39/0125 119/57.2 |
| 5,765,503 A | 6/1998 | van Daele | |
| 5,927,232 A | 7/1999 | Pollock | |
| 6,779,486 B2 * | 8/2004 | Vaags | A01K 61/02 119/51.02 |
| 6,786,178 B2 | 9/2004 | De Rouck | |
| 8,074,602 B2 | 12/2011 | Laliberte | |
| 8,915,214 B2 * | 12/2014 | Pickens | A01K 39/0125 119/53 |
| 2003/0061998 A1 | 4/2003 | Voogd et al. | |
| 2006/0201432 A1 | 9/2006 | Pratt | |
| 2010/0031891 A1 * | 2/2010 | Sie | A01K 5/0266 119/53 |

FOREIGN PATENT DOCUMENTS

| | | |
|---|---|---|
| GB | 802421 | 10/1958 |
| GB | 2190767 | 11/1987 |

OTHER PUBLICATIONS

ISR for related PCT/IB2012/050443 Jul. 3, 2012.
Wilson M, "Balancing genetics, welfare and economics in broiler production", Cobb product focus, 1, 1, 2006.
Cobb Broiler Management Guide, 2013.
Czarick et al, "Bird Migration in Naturally-Ventilated Broiler Houses", Poultry Housing Tips vol. 6, No. 3. 1994.
Aha, "Animal Welfare Standards for Broiler Chickens", 2012.
Boostani, A., et al. "Comparison of the effects of several feed restriction periods to control ascites on performance, carcass characteristics and hematological indices of broiler chickens." Revista Brasileira de Ciência Avícola 12.3 (2010): 170-177.
"Laying down minimum rules for the protection of chickens kept for meat production", EU Council Directive 2007/43/EC, 2007.
Vest L, "Factors Affecting Feed Conversion in Broilers", 1999.
Ferket, Peter R., and Abel G. Gernat. "Factors that affect feed intake of meat birds: A review." International Journal of Poultry Science 5.10 (2006): 905-911.
Farmed animal welfare code of practice 2012.
Czarick et al, "Monitoring Broiler Distribution Through Water Consumption", Poultry Housing Tips vol. 14, No. 6. 2002.
Defra, "Interim guidance for keepers of conventionally reared meat chickens in relation to the Welfare of Farmed Animals (England) Regulations 2007 as amended by the Welfare of Farmed Animals (England) (amendment) Regulations 2010", 2011.

* cited by examiner

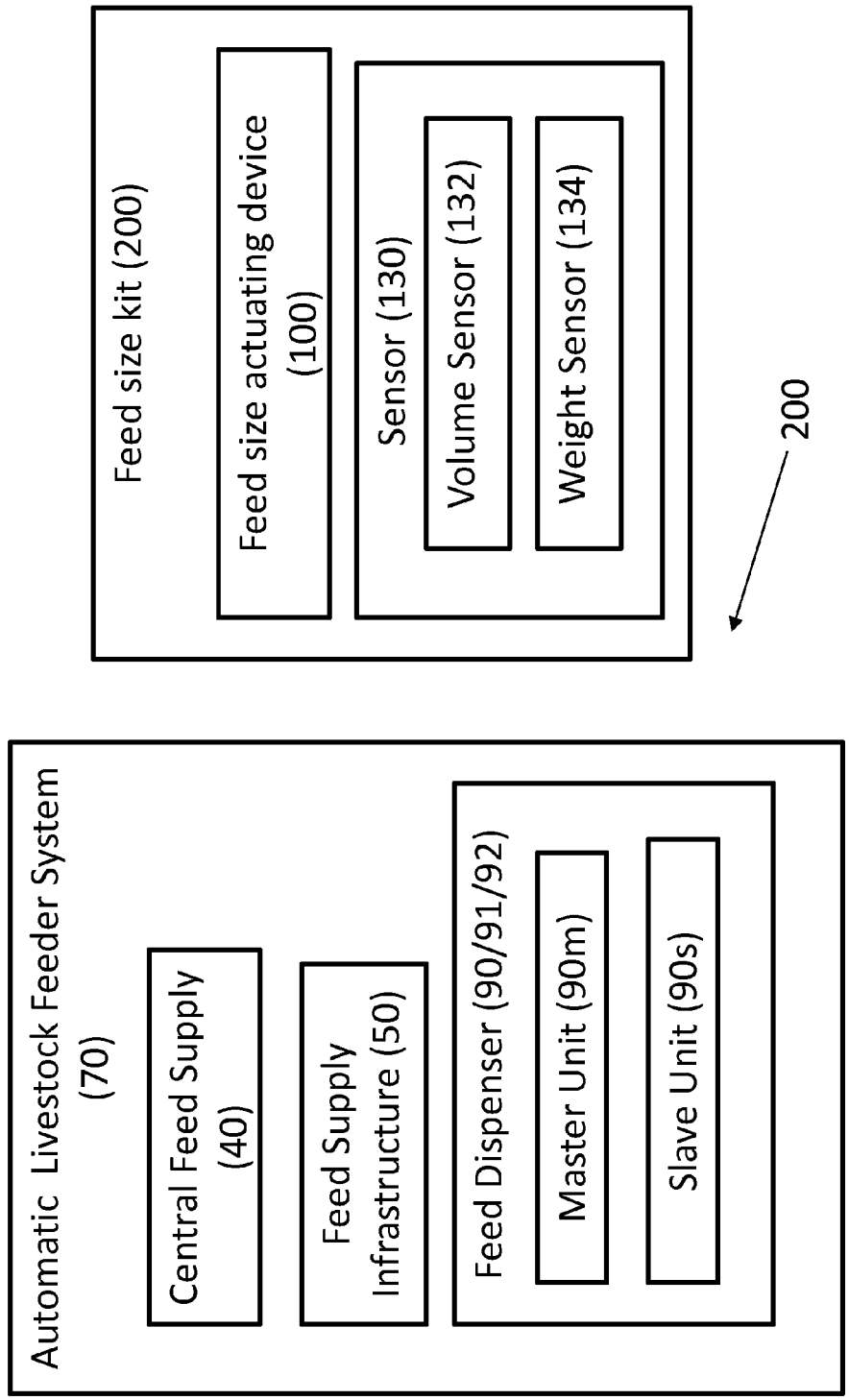

DEVICE, SYSTEM AND METHOD FOR LIVESTOCK FEEDING

FIELD OF THE INVENTION

The present invention relates to a device, system and a method for livestock feeding, and in particular, to such a device, system and method in which, the meal size and frequency of meal delivery are controllable based on measurable parameters and expected livestock growth curve and real time parameters.

BACKGROUND OF THE INVENTION

Livestock and in particular poultry are bred, and grown en-masse to meet the growing needs for their consumable products primarily in the form of meat, eggs, and the like foods. In order to allow for en-masse growth an automatic growing and feeding system has been developed for example to allow for mass production of meat, allowing poultry farmers to grow their livestock in cycles of about 45 to 60 days.

Such early systems, dating back to 1958, as for example taught by GB802421A to James MFG. Co., incorporated herein by reference as if fully set forth, depicts an automated feeding system that allows such mass growth of poultry livestock for the meat market. Such system teach a centralized feeding system that may supply feed to thousands of birds simultaneously, which greatly reduced the human intervention required in growing and raising livestock, such as poultry, allowing mass production to meet the increasing need for meat.

Since its early days the primary development in the automatic feeding system has been based on the feed dispenser or plate itself. For example, U.S. Pat. No. 3,971,340 to Allen, incorporated herein by reference as if fully set forth, describes a feed through system for controlling the amount of food made available to poultry by controlling the size of the plate opening by controlling the height of the feeding plate.

Similarly, U.S. Pat. No. 5,765,503 to van Daele, incorporated herein by reference as if fully set forth, depicts and improvements with respect to the feed dispenser to control feed rationing for the livestock.

Various improvements have been directed to the overall improvement and dimensions of the livestock housing, as for example taught by U.S. Pat. No. 6,786,178 to De Rouck, incorporated herein by reference as if fully set forth.

Poultry for example in the form of chicken or turkey are generally grown en-masse for varying markets such as the meat market, breeding market, egg market or the like utility market. In order to meet the market demand for poultry mass production is required whereby poultry is grown in large coops or poultry housing allowing the simultaneous growth of many birds. Such mass poultry production is greatly dependent on continuous livestock yield, large flock turnaround, and quick growth period in order to meet market demand while maintaining livestock welfare and bird size uniformity.

Prior art en-masse poultry and livestock feeding systems have a fixed feed dispensing points within the poultry house, where the feed is dispensed to individual plates and/or troughs by conveying the feed from a central storage place. In order to convey the feed to be dispensed from a central storage place to the feed dispensing points, a pipe conveyor system is used, comprising one or more substantially horizontally directed feed conveyor pipes, which are disposed substantially parallel to each other, and are provided with means for conveying feed through them forming a poultry production line. In general the feed distribution points are situated along the feed conveyor pipes.

Poultry are generally fed with a powder form and/or granular form of feed. The feed is distributed by an automatic feeding system to feed a flock of birds within a dedicated living area or coop, as described above. A prior art automatic poultry feeding system, as described in U.S. Pat. No. 6,786,178 is shown in FIG. 1. The automatic poultry feeding system 70 comprising a central feed supply trough 40 placed externally to the coop 60 housing a plurality the poultry flock members 10. The automatic poultry feeding system 70 further comprises feed supply infrastructure 50 including a piping distribution system able to automatically distribute animal feed on three individual production lines 50a, 50b and 50c, where each line comprises a plurality of feed dispensers 90. The feed is distributed to individual production lines 50a-c using a central feed distributor 42 and line specific distributors 44 to line 50a, 46 to line 50b, and 48 to line 50c, respectively. Line specific distributors optionally comprise a mechanism to push feed down the line such as a motor that actuates a conveyor mechanism. The feed is thereafter distributed to individual feed dispensers 90 according to the rate the livestock 10 eat at master feed dispenser 90m that is provided to sense and uniformly control the feed distribution to all slave feed dispensers 90s about the line. The rate at which the livestock eat the available feed at master feed dispenser 90m determines the frequency and availability of feed provided through the dedicated line 50a-c, therein master feed dispenser 90m controls the activation of the dedicated distributor 44, 46, 48. Usually a single master feed dispenser 90m and a plurality of slave feed dispensers 90s are provided for individual production lines 50a-c. Master feed dispenser 90m is placed at the end of the line based on the assumption that feed is consumed evenly along the line since the flock is evenly distributed around the dispensers on a line. Consumption of feed in master dispenser 90m is therefore considered to be representative of consumption along the line.

A feed dispenser 90 is disposed at each feed point. A feed dispenser comprises a tray 92 on which feed comes to rest, which feed can be pecked off tray 92 by the birds. Some feed dispensers 90 comprise feed dispersion guide 94 for guiding a part of the feed out of the horizontal feed conveyor pipe 50 and into the tray 92 of the dispenser 90 in an even manner around tray 92. Guide 94 comprise in general a suitably dimensioned, substantially vertically oriented within the feed down pipe 150, the top end of which is connected to an outlet 160 of the feed conveyor pipe 50, and the bottom end of which is situated above a central part of tray 92

The feed dispenser comprising the tray 92 and the down pipe form a modular unit that can be attached as a whole or in part to a feed conveyor pipe 50. In this way, during use, feed is conveyed into the tray, which feed is pecked out of said tray 92 by the birds 10.

Prior art feed dispensers are schematically depicted in FIG. 2A-2C. The down pipe 150 of dispenser 90 has a set volume that determines the amount of feed that may be delivered and distributed to each tray 92. Current system, such as that depicted in FIG. 1, utilize a master feed dispenser 90m, as shown in FIG. 2C, to control and determine when dispensers 90 and/or slave dispensers 90s, as shown in FIG. 2B, in a feed line 50a-c, are to be replenished, with a volume equal to a pre-set and predetermined feed volume that is equivalent to the volume of down pipe 150. FIG. 2A shows a feed dispenser 90 that comprise a tray 92 and a feed dispersion guide 94 to evenly disperse the feed about plate 92. FIG. 2B shows a slave feed dispenser 90s that comprise a tray 92, while FIG. 2C shows a master feed dispenser 90m comprising a tray 92 and level sensor 96 to determine when to activate feed delivery through infrastructure 50.

The prior art does not provide for fine control of the down pipe area 150 where the delivered feed is of a set volume for the entire production line 50a, 50b, and 50c, and sometimes for an entire poultry housing 60. Furthermore the automatic feeding systems of the prior art has a uniform feed delivery frequency within a poultry housing 60.

The primary deficiency of the prior art is that predetermined feeding volumes and delivery frequencies causes random stops in feeding as all the feed on a line may be consumed before the next feeding time. These periods where portions of the flock are not feeding result in loss of growth potential, loss of growing days, and loss of vitality. The flock may migrate to feeding lines that are not empty, causing overcrowding, fighting, and a related decrease in flock welfare and increase in the stress of the members of the flock. Where prior art comprises a level sensor 96, this is operative to activate feed delivery but does not allow control of feed frequency and volume per feed.

Additionally the feeding systems of the prior art do not include mechanisms to optimize feed delivery frequency and volume based a plurality of parameters including but not limited to livestock type and gender, environmental factors, feed data, market data, livestock psychological data, livestock behavioral data, livestock housing data, livestock eating frequency, livestock metabolic data, and any combination thereof. Further, prior art systems do not include methods to track and record flock response to changes in the feed regimen so that the feed regimen can be analyzed and improved.

Together these deficiencies result lack of flock uniformity, where some birds will be significantly larger than others, disease spread amongst weaker birds, waste of feed, and increased mortality.

SUMMARY OF THE INVENTION

There is an unmet need for, and it would be highly useful to have, a kit, apparatus, device, system and a method providing for fine control of a livestock automatic feeding system, for example including but not limited to poultry automatic feeding system provided by a controllable feed volume and frequency actuating device.

The present invention overcomes the deficiencies of the background art by providing a kit, apparatus, device, system and method for fine control of livestock automatic feed systems with respect to at least one and more preferably a plurality of parameters, with a controllable feed volume and feed frequency actuating device and a system and method for monitoring and controlling such device thereby providing for improved livestock production yield, livestock welfare, livestock feed affinity, and feed conversion ratio ('FCR') and feed conversion efficiency ('FCE').

Although the present invention is described by way of examples and illustrations with respect to poultry for example chicken, fryers, broilers, or turkey, such examples and description are not intended to be limiting to such livestock. Embodiments of the present invention may be applied to and/or adapted for any livestock for example including but not limited to pigs, sheep, goats, cows, emu, ostrich, other poultry, goose, duck, or the like livestock.

Within the context of this application the term feed conversion ratio ('FCR') may interchangeably used to refer to feed conversion rate, feed conversion efficiency ('FCE'), to refers to a livestock's ability to conversion of feed into meat and/or livestock body mass, as is known and accepted in the art.

Within the context of this application the term livestock quarters, livestock housing, poultry housing, coop, poultry coop, chicken coop may be used interchangeably to refer to the a housing structure for housing livestock optionally and preferably in the form of poultry for example including but not limited to chicken, turkey, quail, ducks, geese, emu, ostrich or the like poultry.

Within the context of this application the term master feed dispenser refers to a control feed dispenser that is adapted for controlling the timing of feed delivery into at least one or more feed dispenser disposed in an automatic livestock feed delivery system and more specifically a production line within such an automatic livestock feed delivery system. Optionally a master feed dispenser comprises at least one sensor for detecting feed level and/or feed volume. Most preferably a master feed dispenser may control and/or otherwise activate feed delivery within the feed delivery system along at least one or more production lines.

Within the context of this application the term slave feed dispenser refers to a feed dispenser that is controlled by a master feed dispenser or by the automatic livestock delivery system. Optionally and preferably a slave feed dispenser does not comprise a sensor.

An optional embodiment of the present invention comprises an apparatus and/or kit for retrofitting existing livestock automatic feeder systems with a device provided for fine control of the livestock feed volume and frequency of feed delivery.

Optionally the kit and/or apparatus may provide for manual, automatic and/or semi-automatic control of the feed delivery size and frequency of delivery.

Optionally the kit and/or apparatus may comprise at least one or more sensor, for example including but not limited to a level sensor, volume sensor and/or weight sensor, motion sensor, camera or the like. Optionally the sensor may be based on various different technology for example including but not limited to an optical, piezoelectric, mechanical, capacitance, magnetic, infrared ('IR'), radio frequency ('RF'), MEMS or the like sensor.

Optionally the sensor may provide for controlling a gate or switch. Optionally the sensor may be coupled with an actuator for example for activating, stopping or otherwise controlling the actuator associated with the sensor.

An optional embodiment of the present invention provides a device for fine control of the livestock feed volume and frequency of feed delivery that may be installed, coupled or otherwise integrated with a feed dispenser within an automatic livestock feed delivery system. Optionally the actuating device may be installed, integrated or otherwise coupled with a feed dispenser, for example including but not limited to a master feed dispenser or a slave feed dispenser.

Optionally the actuating device may be installed, integrated or otherwise coupled with at least one or more master feed dispenser.

Optionally the actuating device may be installed, integrated or otherwise coupled with at least one master feed dispenser and a plurality of slave feed dispensers.

Optionally the actuating device may be installed, integrated or otherwise coupled with at least one or more master feed dispenser per production line within the automatic feed dispensing system.

Optionally the actuating device may be installed, integrated or otherwise coupled with at least one or more production line of the automatic feed dispensing system through at least one feed dispenser.

Optionally the actuating device may be installed, integrated or otherwise coupled with each production line of the automatic feed dispensing system through at least one feed dispenser.

Optionally the actuating device may be installed, integrated or otherwise coupled with each production line of the automatic feed dispensing system through at least one or more master feed dispenser.

Optionally the actuating device may be installed, integrated or otherwise coupled with each production line of the automatic feed dispensing system within one master feed dispenser and a plurality of slave feed dispensers.

Optionally the actuating device may be installed, integrated or otherwise coupled with all feed dispensers associated with each production line of the automatic feed dispensing system.

Optionally the actuating device may be installed, integrated or otherwise coupled with at least one or more master feed dispenser per production line within the automatic feed dispensing system, therein preferably producing independently controllable sub-production lines segments within a production line.

An optional embodiment of the present invention provides for a feed dispenser comprising fine control device of feed volume and frequency of delivery. Optionally the feed dispenser may provide for manual, mechanical automatic and/or semi-automatic control of the feed delivery size and frequency of delivery.

An optional embodiment of the present invention provides for an automatic livestock feed system comprising a controller, data processor, a feed volume and feed frequency actuator, and a communications module allowing communication between the components of the invention and also with external systems.

Optionally and preferably a controller may for example included but is not limited to at least one or more of or a computer, including but not limited to a PC (personal computer), a server, a minicomputer, a cellular telephone, a smart phone, a PDA (personal data assistant), a pager, a robot, an android or the like. Most preferably communication with controller may be provided with at least one or more selected from the group comprising of wired, wireless, cellular, optical, IR, RF or the like communication devices and protocols as is known in the art. Optionally controller may communicate through an association with an appropriate communication module.

An optional embodiment of the present invention provides a method for improving livestock growth, livestock feed utilization, quality of meat, quality of life, vitality, increasing metabolism, reducing disease, increasing livestock yield, optimizing livestock environment, and optimizing livestock care most preferably by providing for fine control of feed volume and frequency with respect to at least one and more preferably a plurality of parameters.

Optionally parameters utilized for improving livestock growth may for example include but are not limited to environmental parameters such as climate and lighting regimens, livestock parameters, market parameters, feed parameters, livestock behavioral parameters, livestock psychological parameters, livestock eating demand, livestock drinking, livestock cleaning behavior, livestock social activity, pavlovian behavior or the like alone or in any combination thereof.

Optionally livestock psychological and/or behavioral parameters comprises flock migration and/or movement within housing, flock migration and/or movement relative to productions lines, eating demand in response to the system, imprinting behavior in response to the system, pavlovian behavior with respect to the system, or the like. Imprinting and pavlovian behavior may be in response to optional system noises such as motor noise or audio cues such as beeping noises introduced at the start of feeding time.

Optionally livestock psychological and or behavioral parameters may be monitored to determine flock eating demands and/or individual flock member eating demand as it varies at different points during the growth period, most preferably in order to optimize the available growth periods.

Optionally the system may determine the changes in feed demand and or eating demand based on location within livestock housing. Optionally the system and method of the present invention may provide for sensing livestock behavior, environmental conditions, for example particular affinity to a location within the housing or a particular feed dispenser or type of dispenser, in order to adjust the automatic feeding system to accommodate and/or change such behavior, most preferably to control, maintain, and/or improve livestock growth and/or flock uniformity, relative to expected growth curve, optionally and preferably established by variably controlling the feed volume and feed frequency within the livestock housing and about the individual production lines. Optionally the system may monitor feed demand in order to determine whether this is different to expected or historical feed consumption patterns.

Optionally, external systems for example the climate control system within the housing may be adjusted based on observation of feeding patterns correlated with temperature and humidity changes. Other environmental control systems, such as lighting systems may optionally calibrate—the provision of light so as not to collide with feeding patterns; in other words, the lighting system may optionally receive feedback from the feeding system so as to determine when the lights should be turned on and off.

According to at least some embodiments, the system further comprises an environmental sensor for providing information on the environment for the livestock in communication with said feedback monitor, wherein any changes in said environment are correlated with the amount of feed eaten on a historical or actual basis to determine whether said change increases or decreases the amount of food eaten.

The data processing module may also optionally receive one or more feeding parameters, animal behavior parameters or both according to a predetermined goal, and wherein said data processing module further determines an amount of feed to provide according to data from said environmental sensor.

The predetermined goal is optionally selected from the group consisting of reaching a predetermined maximum weight, reaching a predetermined minimum weight within a predetermined period of time or maximizing welfare of the animals. By "maximizing welfare of the animals" it is meant reducing stress, physical illness or fighting between the animals.

Optionally and preferably the actuating device of the present invention provides for controlling feed frequency and feed volume in an inversely proportional manner, such that high frequency feed delivery is provided for smaller feed portion, and low frequency feed delivery is provided for larger feed portions.

An optional embodiment of the present invention provides for a feed volume and feed delivery frequency actuating device for controlling the feed volume and feed frequency of feed delivered to livestock through an automatic feed dispenser system wherein the actuating device may be retrofit and/or integrated with a feed dispenser about a feed drop zone, the actuating device comprising: a divider for dividing the feed drop zone internal to the feed dispenser and along the horizontal cross-section of the drop zone, into at least two size controllable zones, including a feed delivery closed zone; and a feed delivery open zone; and wherein the divider may be displaced along a distance equal to about the horizontal cross-section of the drop zone for defining the at least two size controllable zones; and wherein the divider may be displaced about the drop zone with an actuator, wherein the actuator may be associated with the divider through at least one driving shaft; and wherein the upper edge of the divider may be further removably associated with a hinged cover for defining the feed delivery closed zone.

Optionally the hinged cover may be coupled with an external face of the feed dispenser with a hinge.

Optionally the actuator may be disposed on an external surface of the feed dispenser.

Optionally the actuator may be provided in the form for example including but not limited to a manual actuator, a mechanical actuator, an electronic actuator, an automatic actuator or any combination thereof.

Optionally the automated actuating device may be controllable from at least one for example including but not limited to a remote location, wirelessly, cellular, optical, IR, RF or any combination thereof.

Optionally and preferably the automated actuating device may be controlled by a controller.

Optionally, the feed dispenser may preferably comprise at least one actuating device, may be a master feed dispenser or slave feed dispenser; and wherein the hinged cover may be coupled with an external face of the feed dispenser with a hinge; and wherein the actuator may be disposed on the external surface.

Optionally a feed dispenser according to the present invention may including at least two actuating devices, wherein the feed dispenser may be a master or slave feed dispenser and wherein a first actuating device may be associated with a first face of the feed dispenser and wherein a second actuating device may be associated with a second face of the feed dispenser wherein the first and second face are disposed on opposite faces of the feed dispenser, therein defining at least three size controllable zones comprising one central feed delivery open zone and two feed delivery closed zone on either side of the central feed delivery open zone.

Optionally the feed dispenser may further comprise at least one sensor for example including but not limited to a volume sensor, level sensor or weight sensor, or the like.

An optional embodiment of the present invention provides for an apparatus for controlling the feed volume and feed frequency of feed delivered to a plurality of feed dispensers as part of an automatic livestock feed dispenser system, the apparatus comprising: a feed volume and feed delivery frequency actuating device optionally and preferably associated with at least one feed dispenser; and at least one sensor for example including but not limited to a volume sensor, level sensor or weight sensor; wherein the sensor may be disposed internally to the feed dispenser.

Optionally the apparatus may further comprise a controller for controlling the actuating device based on data optionally and preferably obtained and processed with a data processing module and wherein the data may optionally and preferably be communicated to the controller or to an external system with a communication module. Optionally the communication module may provide for communication between the controller, the actuating device, and an external storage or controlling device.

Optionally the data processing module may provide for obtaining and processes data for example including but not limited to livestock data, feed data, environmental data, market data, livestock psychological data, livestock behavioral data, livestock housing data, livestock eating frequency, livestock metabolic data, or the line in any combination thereof.

An optional embodiment of the present invention provides for an automatic livestock feed delivery system for automatically dispensing feed to livestock, being raised within livestock housing, the system comprising: feed supply infrastructure to convey livestock feed from a central feed supply to a plurality of feed dispensers, wherein each of the feed dispensers are disposed about a feed outlet point; a feed volume and feed delivery frequency actuating device for controlling the feed volume and frequency of delivering the feed volume to livestock; and at least one sensor for example including but not limited to a volume sensor, level sensor or weight sensor; wherein the sensor may optionally and preferably be disposed internally with the feed dispenser; and a controller for controlling the actuating device based on data obtained and processed with a data processing module and wherein the data may be communicated to the controller with a communication module.

Optionally the communication module may provide for communication between the controller and the actuating device. Optionally the data processing module may obtain and processes data for example including but not limited to livestock data, feed data, environmental data, market data, livestock psychological data, livestock behavioral data, livestock housing data, livestock eating frequency, livestock metabolic data, and any combination thereof.

Optionally the actuating device may be associated with the feed dispenser or with the infrastructure system at feed outlet points.

Optionally a plurality of feed dispensers may be provided in the form of master feed dispensers including a feed level sensor and the feed supply infrastructure may be a closed loop system for circulating the feed.

Optionally feed supply infrastructure may comprise at least one and more preferably a plurality of individual production lines and most preferably at least three or more production lines.

Optionally at least two actuating devices may be associated with at least two or more individual master feed dispenser within at least one or more production line, providing for at least one or more sub-production line within the at least one or more production line.

An optional embodiment provides for a method for optimizing livestock yields and livestock parameters by utilizing a feed volume and feed delivery frequency actuating device within an automatic feed delivery system, the method comprising:

Obtaining data selected from the group consisting of livestock data, environmental data, livestock housing data, grower data, marketing data, environmental data, weather data, feed data, livestock growth chart or any combination thereof; and Integrating and analyzing the obtained data to determine optimal growing conditions according to the available data; and Adjusting controllable conditions associated with the automatic feeding system for example including but not limited to feeding frequency, meal size, livestock housing environmental conditions, livestock system activation frequency, to optimize feed frequency, livestock metabolism and livestock distribution about the feed supply infrastructure within livestock housing; wherein feed frequency and feed volume are controlled in an inversely proportional manner; and Continuously monitoring and analyzing livestock growing rate and adjust the controllable conditions until the livestock reach market size target weight.

Optionally embodiments of the present invention may be adapted for providing a kit, apparatus, device, system and method for automated, semi-automated and/or regulated human feeding and/or food consumption for example in the form of food rationing and/or food dispensing for rationing. For example control of human food consumption and dispensing may for example be implemented in military setting, hospital setting, or the like en-mass feeding environment, or weight controlled feeding. For example, human food consumption and dispensing control may be utilized for dispensing and distributing food for babies and/or premature babies such that data may be correlated to improve survival rate. The system may for example be utilized for food rationing and control in regions with starvation problems, drought stricken regions, and/or during natural disasters, or the like.

Unless otherwise defined the various embodiment of the present invention may be provided to an end user in a plurality of formats, platforms, and may be outputted to at least one of a computer readable memory, computer readable media, a computer display device, a printout, a computer on a network or a user.

Unless otherwise defined, all technical and scientific terms used herein have the same meaning as commonly understood by one of ordinary skill in the art to which this invention belongs. The materials, methods, and examples provided herein are illustrative only and not intended to be limiting. Implementation of the method and system of the present invention involves performing or completing certain selected tasks or steps manually, automatically, or a combination thereof. Moreover, according to actual instrumentation and equipment of preferred embodiments of the method and system of the present invention, several selected steps could be implemented by hardware or by software on any operating system of any firmware or a combination thereof. For example, as hardware, selected steps of the invention could be implemented as a chip or a circuit. As software, selected steps of the invention could be implemented as a plurality of software instructions being executed by a computer using any suitable operating system. In any case, selected steps of the method and system of the invention could be described as being performed by a data processor, such as a computing platform for executing a plurality of instructions.

Although the present invention is described with regard to a "computer" it should be noted that optionally any device featuring a data processor and/or the ability to execute one or more instructions may be described as a computer, including but not limited to a PC (personal computer), a server, a minicomputer, a cellular telephone, a smart phone, a PDA (personal data assistant), a pager, a robot, an android or the like. Any two or more of such devices in communication with each other, and/or any computer in communication with any other computer or device comprising a processor, may optionally comprise a "computer network".

BRIEF DESCRIPTION OF THE DRAWINGS

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in order to provide what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings:

FIG. 2A depicts prior art feed dispenser with a central feed guide; FIG. 2B depicts a prior art slave feed dispenser and FIG. 2C depicts a prior art master feed dispenser.

FIG. 3A-B depict optional master feed dispensers associated with optional feed actuating device according to optional embodiments of the present invention; FIG. 3C depicts an existing feed dispenser retrofitted with a sensor and actuating mechanisms allowing it to function as a master feed dispenser; FIG. 3D-E depicts an optional master feed dispenser associated with the actuating device of the present invention comprising a vertical feed volume control actuator; FIG. 3F depicts an optional master feed dispenser associated with the present invention comprising several vertically distributed sensors.

FIG. 4A-B are schematic block diagrams of optional apparatus and/or kits for retrofitting a feed volume and feed frequency actuating device according to an optional embodiment of the present invention with an automatic feed delivery system dispenser. FIG. 4A depicts a manually controllable feed volume and feed frequency device, FIG. 4B depicts an automatic controllable feed volume and feed frequency device according to an optional embodiment of the present invention;

DESCRIPTION OF THE PREFERRED EMBODIMENTS

Figure 1:
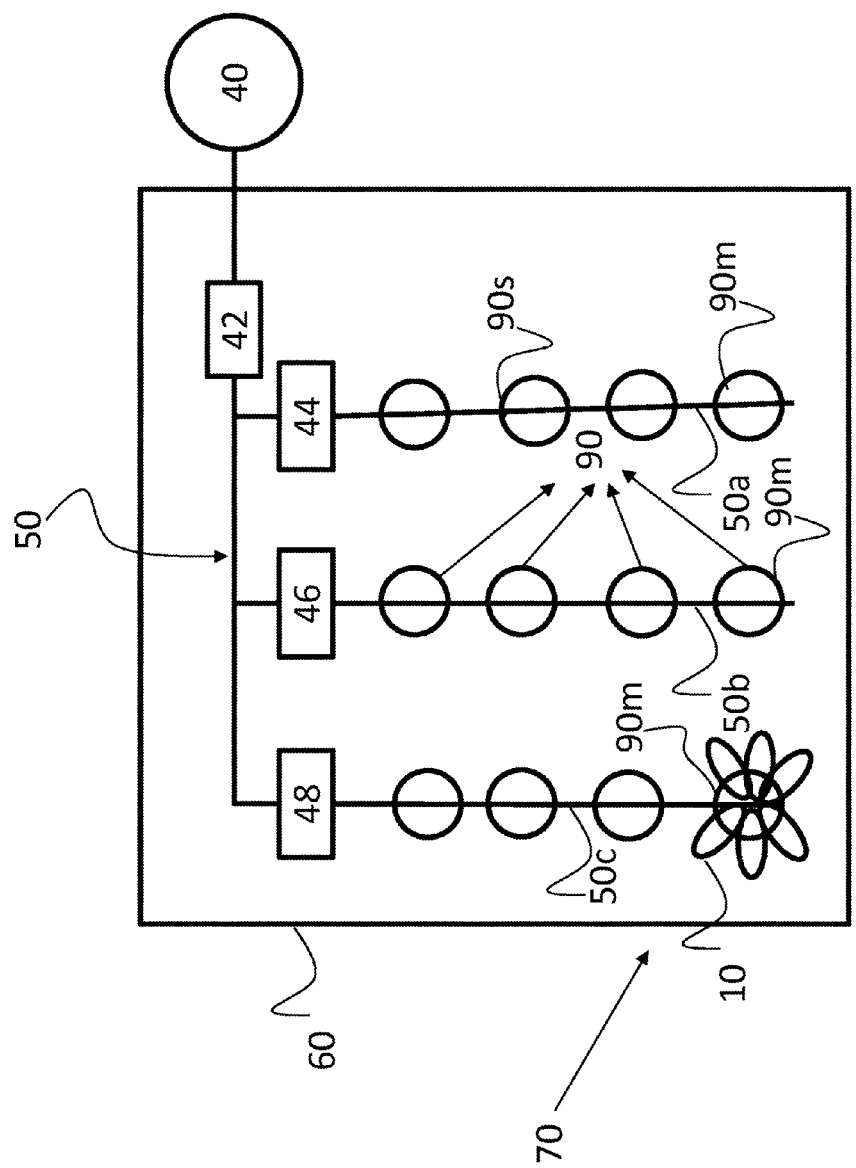
FIG. 1 is a schematic block diagram of prior art automatic poultry feed delivery system.

The present invention overcomes the deficiencies of prior art livestock automatic feed system by providing a kit, apparatus, device, system and method for fine control of livestock automatic feed systems providing for improved livestock production yield. Optional embodiments of the present invention provide fine control over the feed volume and feed frequency delivered to the livestock, for example at individual lines and optionally customizing feed volume and frequency according to a plurality of parameters.

Control over feed volume and frequency delivered to the individual lines may also help with controlling the amount of manure (fecal waste, such as droppings) deposited at any particular location. For example, for poultry, litter needs to be maintained at acceptable levels. Litter is defined as excreted manure mixed with bedding material.

If litter is not kept at an acceptable level, very high bacterial loads and unsanitary growing conditions may result producing odors (including ammonia), insect problems (particularly flies), soiled feathers, footpad lesions and breast bruises or blisters.

By distributing feed over a plurality of different lines, the amount and location of litter can also be controlled and maintained at a desirable level.

As described above, prior art poultry automatic feed systems result in problems such as lack of flock uniformity, where some birds will be significantly larger than others, competition for feed between birds, high flock mortality rate, disease spread amongst weaker birds, variable feed demand, uneven bird market size, underutilization of feed, waste of feed, unpredictable bird market size and uneven production line distribution.

Embodiments of the present invention provide for improvement in a number of parameters associated with livestock production and in particular with respect to poultry for example providing for improved flock vitality, reduced flock stay period, ability to reach targeted market weight faster, more even flock weight distribution, reduced competitions among flock members, improved flock welfare and reduced stress, reduced cost of production, improved flock health, reduced mortality within the flock, faster time to market, increased feed consumption, increased feed utilization, improved flock uniformity, increased growth, increased flock member metabolism, higher quality meat, and a more equitable utilization of all production lines.

The principles and operation of the present invention may be better understood with reference to the drawings and the accompanying description. The following reference labels listed below are used throughout the drawings to refer to objects having similar function, meaning, role, or objective.

10 livestock member;
40 central feed supply;
42 central feed distributors;
44, 46, 48 line specific distributors;
50 feed supply infrastructure;
50a,b,c poultry production lines;
52 closed loop feed supply infrastructure;
60 livestock housing;
70 Automatic livestock feeding system;
90 feed dispenser;
90m master feed dispenser;
90s slave feed dispenser;
91 vertical feed dispenser;
92 feed dispenser plate;
94 feed dispenser guide;
96 feed dispenser level sensor and switch;
100, 100L, 100R feed volume actuating device;
102, 102L, 102R down pipe feed volume divider;
104, 104L, 104R down pipe feed volume actuator cover;
106, 106L, 106R cover hinge;
110, 110L, 110R feed volume actuator;
112, 112L, 112R feed volume driver shaft;
112v vertical drive shaft movement;
114 vertical drive shaft switch;
116 vertical drive feed volume level indicator
118 vertical drive slot;
120 static feed volume control wall;
130 sensor module;
132 volume sensor;
134 level sensor;
150 down pipe;
151 down pipe horizontal cross section
152 feed delivery zone;
154 down pipe closed area;
154L down pipe left closed area;
154R down pipe right closed area;
155 feed volume control area;
160 feed outlet;
200 retrofit kit and/or apparatus
202 automatic retrofit kit and/or apparatus
210 controller;
215 communication module;
220 data processor module;
222 livestock data module;
224 feed data module;
226 environmental data module;
228 market data module;
300, 302, 304 Automatic livestock Feeding system.

Figure 3A:
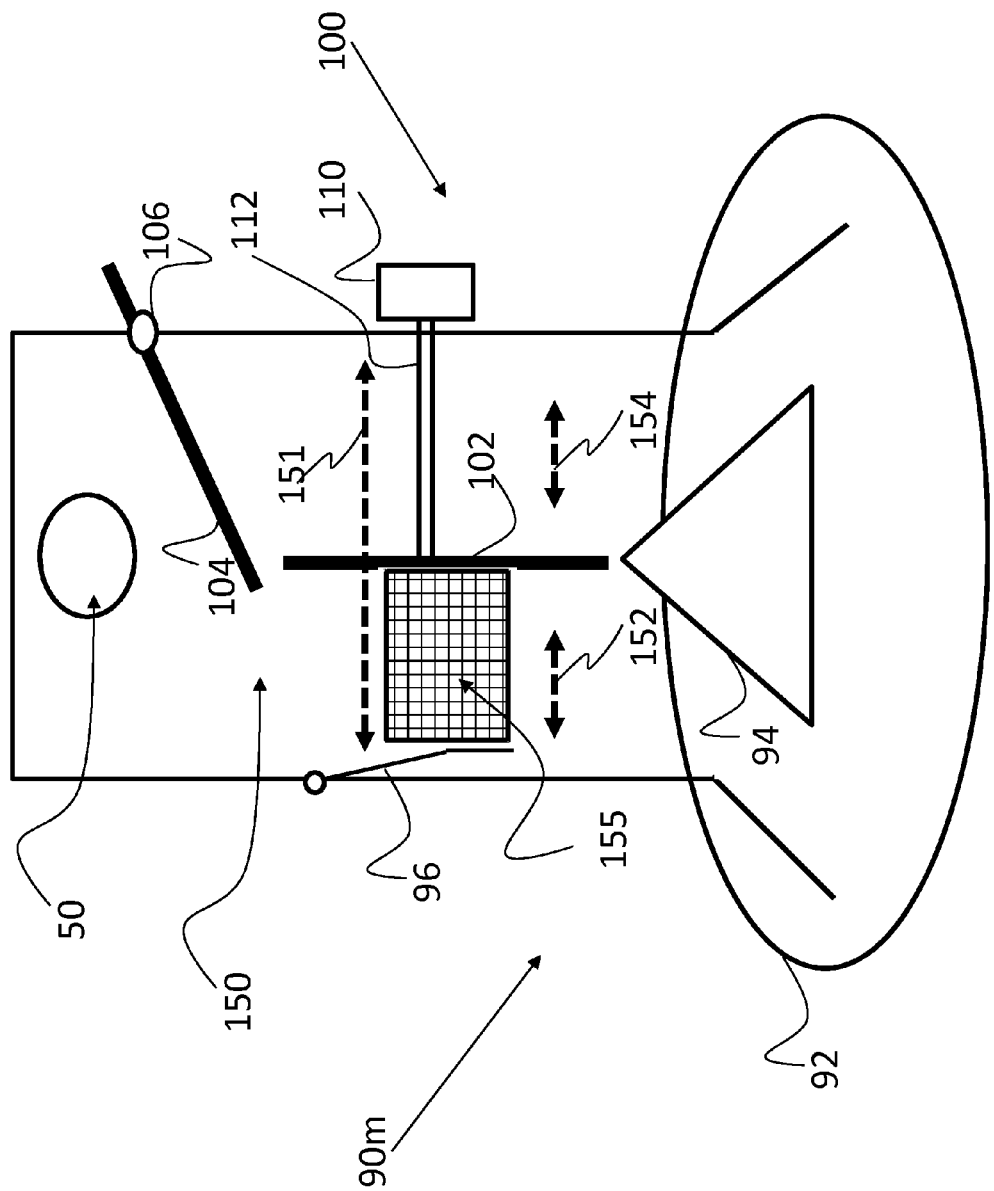
FIG. 3A-F are schematic diagrams of feed dispenser comprising a feed volume and feed delivery frequency device according to an optional embodiment of the present invention.

Referring now to the drawings, FIG. 3A is schematic block diagram of an optional master feed dispenser 90m comprising one feed volume and feed delivery actuating device 100, according to an optional embodiment of the present invention. Device 100 most preferably comprises actuator 110, shaft 112, divider 102, hinge 106 and cover 104

Most preferably actuator 110 provides for moving divider 102 along shaft 112 within the cross-section of drop tube 150 as depicted by arrow 151. Most preferably use of actuator 110 provides for defining a dispenser volume zone 155 defined as the zone between divider 102 and level sensor 96, as shown.

Most preferably hinge 106 and actuator cover 104 are provided to prevent feed from falling behind divider 102 as defined by arrow 154 while ensuring that feed is dispensed into the feed delivery zone 152. Most preferably, the movement of divider 102 is associated with cover 104 such that as divider 102 is displaced within zone 151 so does cover 104 to ensure that feed does not enter zone 154.

Most preferably sensor 96, optionally and preferably in the form of a level sensor and/or a volume sensor, is provided to time and activate food delivery into plate 92, by activating feed delivery through infrastructure 50, along a production line 50a or 50b or 50c. For example as feed is consumed by poultry 10 the feed level gradually drops to a level that is below sensor 96 causing a trigger. Most preferably, sensor 96 then activates infrastructure 50 to circulate feed about production lines 50a, 50b, and 50c and deliver feed into drop zone 150, and more specifically zone 152.

Sensor 96 may optionally be provided in the form a level sensor as shown, volume sensor and/or weight sensor, or the like. Optionally the sensor may be based on at least one or more sensor technologies for example including but not limited to acoustic, optical, piezoelectric, mechanical, capacitance, magnetic, RF, MEMS or similar technology sensor technology for determining weight and/or volume and/or level of a substance.

Optionally device 100 may be provided in a manual form where divider 102 is set within zone 151 by manually displaced divider 102 about shaft 112. Optionally and most preferably manual manipulation and/or control of divider 102 is provided on the external surface of dispenser 90m for example by displacing shaft 112 backwards.

Optionally and more preferably device 100 may be provided in an automatic and/or semi-automatic form where divider 102 is automatically displaced about shaft 112 within zone 151 utilizing actuator 110. Optionally actuator 110 may be provided in the form of a motor, actuator or the like that may controllably manipulate the movement of divider 102 within zone 151. Optionally actuator 110 may be controlled via wired, wireless, cellular means.

Figure 3B:
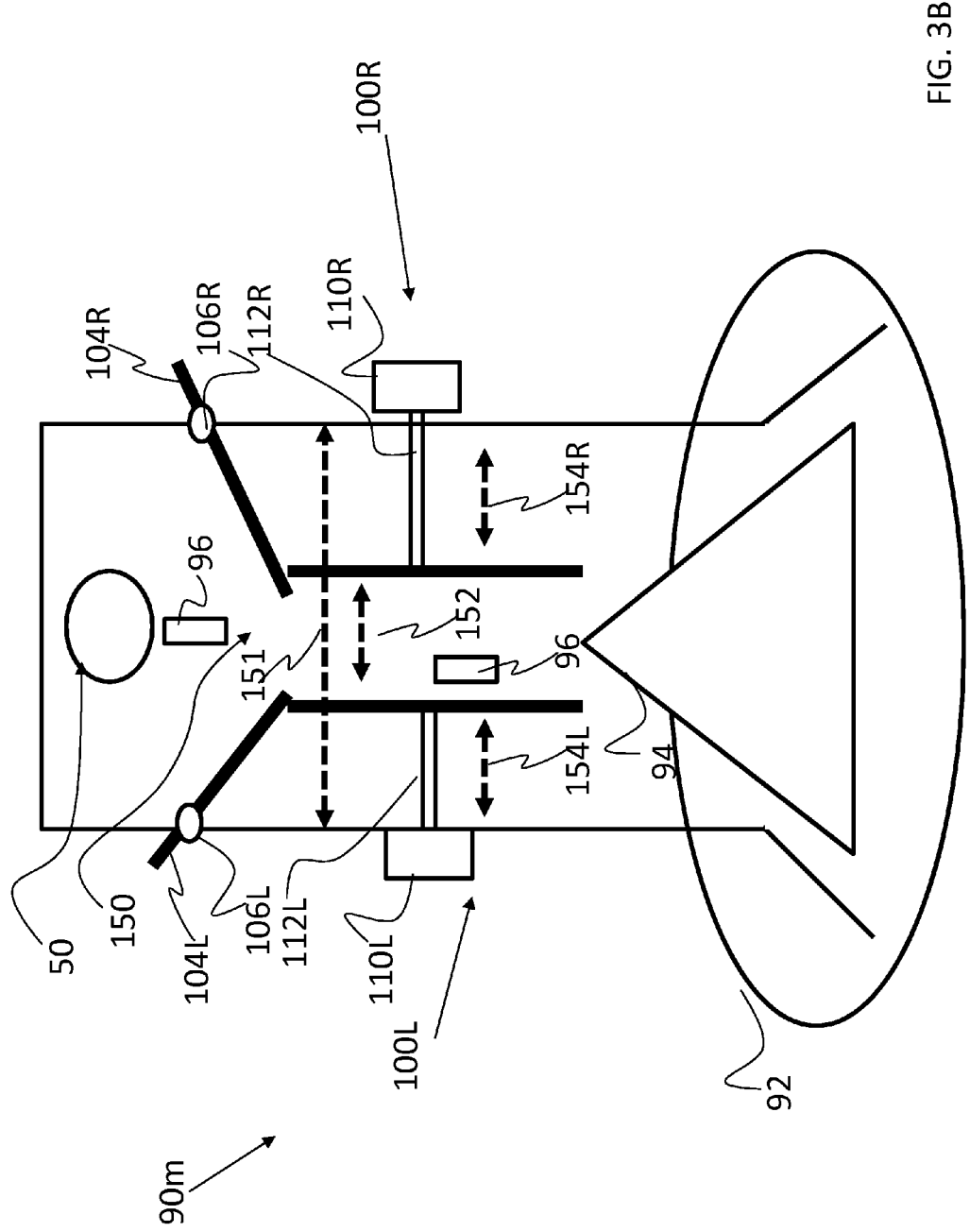

FIG. 3B is schematic block diagram of an optional master feed dispenser 90m comprising a feed dispersion guide 94, and at least two feed volume and feed delivery frequency actuating devices 100, disposed about at least two opposite faces of dispenser 90m. Optionally and most preferably dispenser 90m comprises a level and/or volume sensor 96.

A first actuating device 100L may be disposed on the left inner face of dispenser 90m and a second actuating device 100R may be on the right inner face of dispenser 90m, as shown. Most preferably each actuating device 100L and 100R comprises actuator 110, shaft 112, divider 102, hinge 106 and cover 104. For example actuating device 100R comprises actuator 110R, shaft 112R, divider 102R, hinge 106R and cover 104R while actuating device 100L comprises actuator 110L, shaft 112L, divider 102L, hinge 106L and cover 104L.

Optionally and preferably the use of at least two actuating devices provides for directing feed delivery centrally through zone 152, for example to allow feed delivery above feed dispersion guide 94. Most preferably the size and volume of feed to be delivered in zone 152 is determined by adjusting the relative respective locations of divider 102R and 102L relative to one another.

Most preferably feed dispenser 90m of FIG. 3B comprises at least one or more level and/or volume sensor 96 provided for most preferably sensing the level of feed disposed within dispenser 90m. Optionally sensor 96 may be disposed on a third (not shown) and/or fourth face (not shown) within dispenser 90m.

As described above in FIG. 3A with respect to actuating device 100, actuating device 100L and/or 100R may be provided in a manual, semi-automatic and/or automatic form to provided for a controlled feed volume and feed delivery frequency. Optionally and preferably device 100L and/or 100R may be individually controlled, where for example, one device (100L for example) is manipulated, adjusted and/or moved while the other device (100R for example) remains stationary. Optionally devices 100L and 100R may be controlled relative to each other and most preferably essentially simultaneously, where for example both devices 100L and 100R are displaced by the same amount in opposite direction so as to expand and/or reduce feed delivery zone 152.

Most preferably the timing, size, shape, volume of feed delivery zone 152 may be controlled by manipulating devices 100L and/or 100R in a symmetric and/or asymmetric manner. Optionally and preferably control of feed delivery zone may be related to at least one and more preferably a plurality of parameters for example including but not limited to growth curve, feed demand, environmental parameters, livestock parameters, market parameters, feed parameters, livestock behavioral parameters, livestock psychological parameters, livestock eating demand, livestock drinking, livestock cleaning behavior, livestock social activity, pavlovian behavior or the like alone or in any combination thereof.

Optionally and more preferably the actuating device 100 provides for controlling feed frequency and feed volume in an inversely proportional manner, such that high frequency feed delivery is provided for smaller feed portion, and low frequency feed delivery is provided for larger feed portions.

Most preferably fine control of the feed delivery zone 152 and/or 155 by use of at least one or more feed actuating devices 100, for example as described and shown in FIGS. 3A-B, provide control both in term of the frequency of feed delivery and the size of the dispensed feed. This results in distinct improvements and control of livestock yield, livestock metabolism, livestock vitality, livestock mortality, livestock stay period, livestock growth rate, livestock size uniformity, time to market, livestock health, optimized feed utilization, optimization of production lines, optimization of cost of production, optimization of energy consumption and utilization used in the livestock growth process, or similar parameters contributing to improved livestock yields.

Figure 3C:
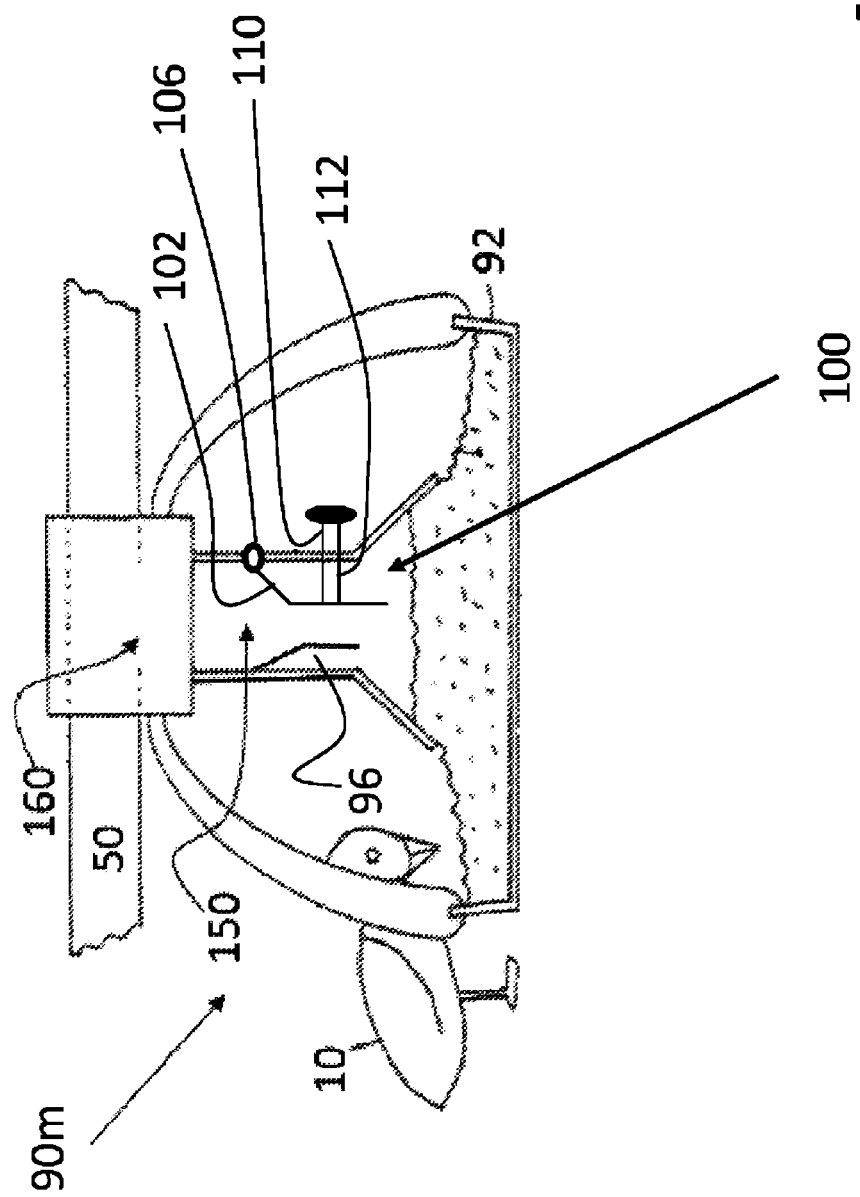

FIG. 3C is a schematic block diagram of an existing feed dispenser 90 that has been retrofitted with a feed volume and feed delivery actuating device 100 and a level sensor 96 according to an optional embodiment of the present invention. Device 100 most preferably comprises actuator 110, shaft 112, divider 102, and hinge 106.

Most preferably actuator 110 provides for moving divider 102 along shaft 112 within the cross-section of drop tube 150. Most preferably use of actuator 110 provides for limiting dispenser volume zone 150 defined as the zone between divider 102 and level sensor 96, as shown.

Most preferably sensor 96, optionally and preferably in the form of a level sensor and/or a volume sensor, is provided to time and activate food delivery into plate 92, by activating feed delivery through infrastructure 50, along a production line 50a or 50b or 50c. For example as feed is consumed by poultry 10 the feed level gradually drops to a level that is below sensor 96 causing a trigger. Most preferably, sensor 96 then transmits data to the previously described data processor, for example through the previously described communicator, to determine whether to send infrastructure 50 to circulate feed about production lines 50a, 50b, and 50c and deliver feed into drop zone 150.

Sensor 96 may optionally be provided in the form a level sensor as shown, volume sensor and/or weight sensor, or the like. Optionally the sensor may be based on at least one or more sensor technologies for example including but not limited to acoustic, optical, piezoelectric, mechanical, capacitance, magnetic, RF, MEMS or similar technology sensor technology for determining weight and/or volume and/or level of a substance.

Optionally device 100 may be provided in a manual form where divider 102 is set within zone 150 by manually displaced divider 102 about shaft 112. Optionally and most preferably manual manipulation and/or control of divider 102 is provided on the external surface of dispenser 90m for example by displacing shaft 112 backwards.

Optionally and more preferably device 100 may be provided in an automatic and/or semi-automatic form where divider 102 is automatically displaced about shaft 112 within zone 150 utilizing actuator 110. Optionally actuator 110 may be provided in the form of a motor, actuator or the like that may controllably manipulate the movement of divider 102 within zone 150. Optionally actuator 110 may be controlled via wired, wireless, cellular means.

Figure 3D:
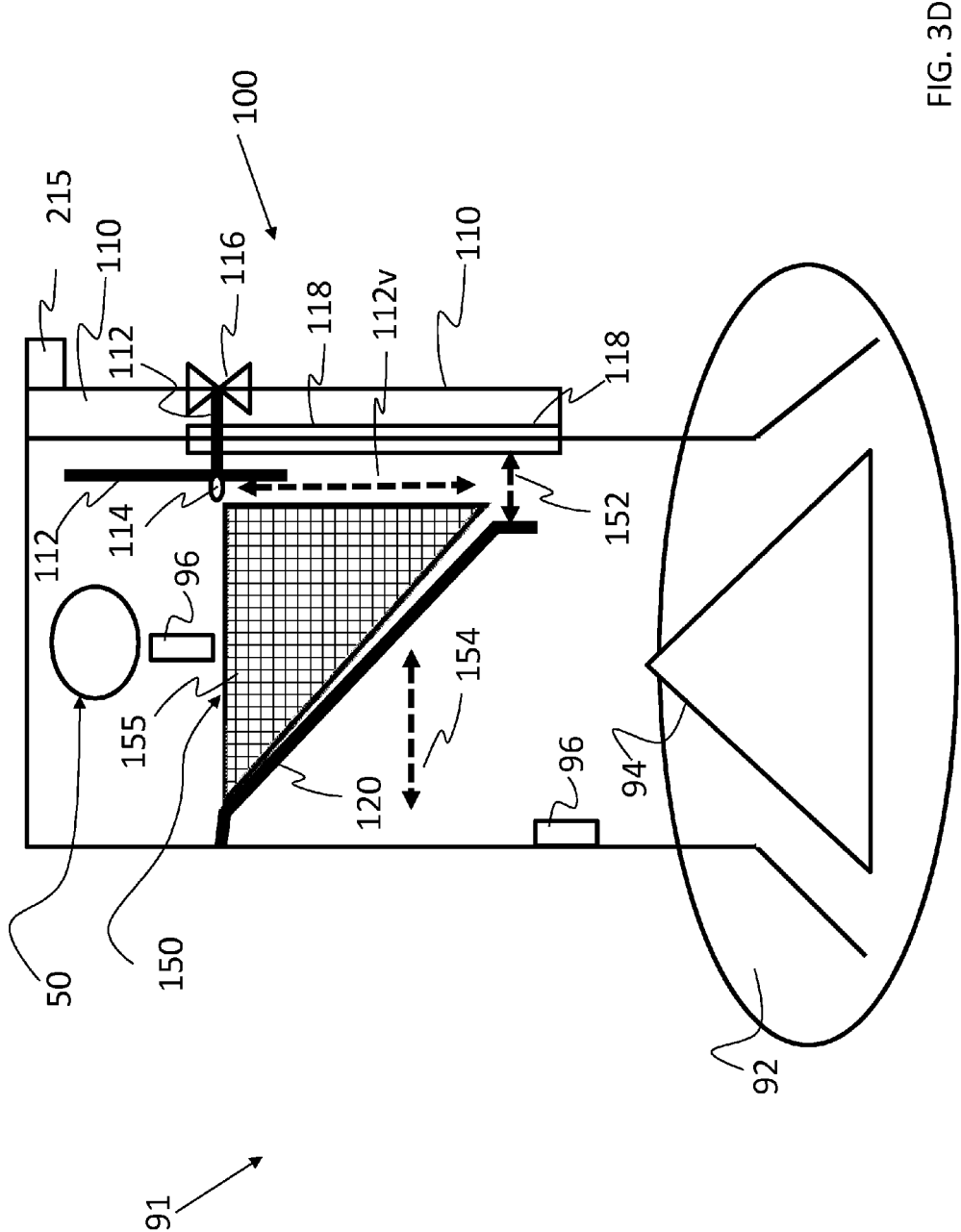
Figure 3E:
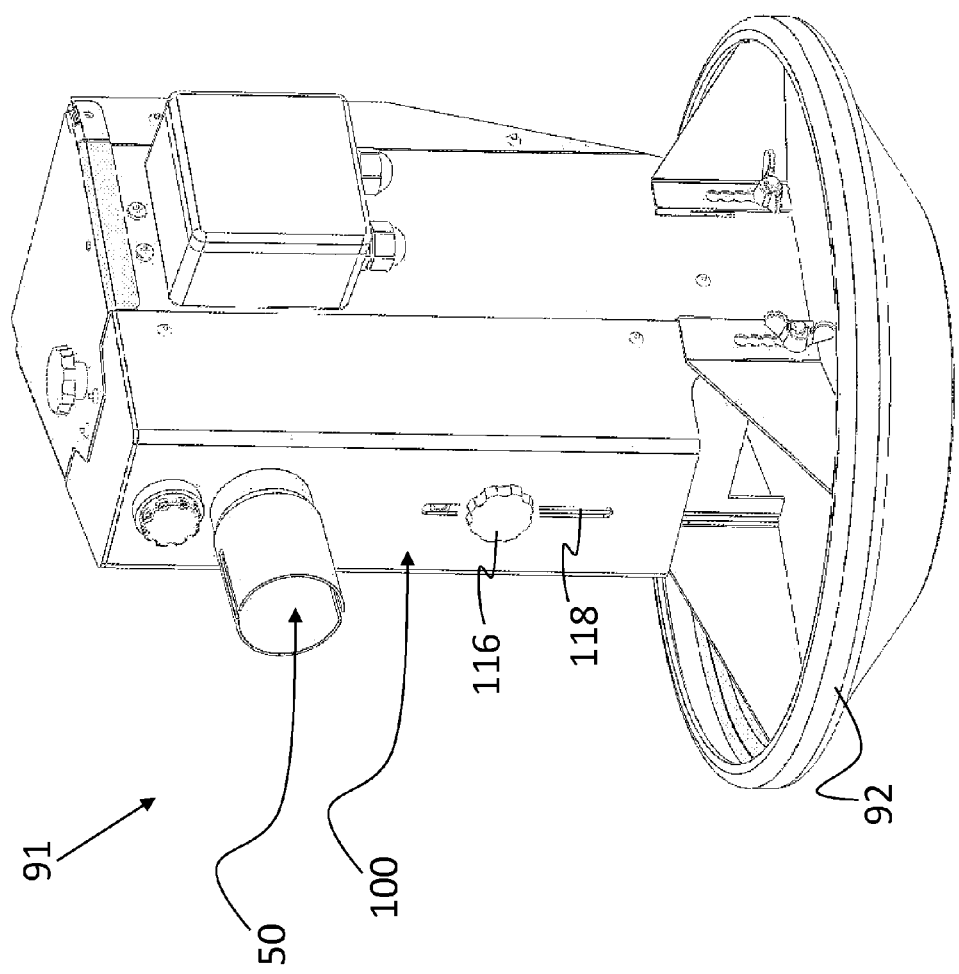
Figure 3F:
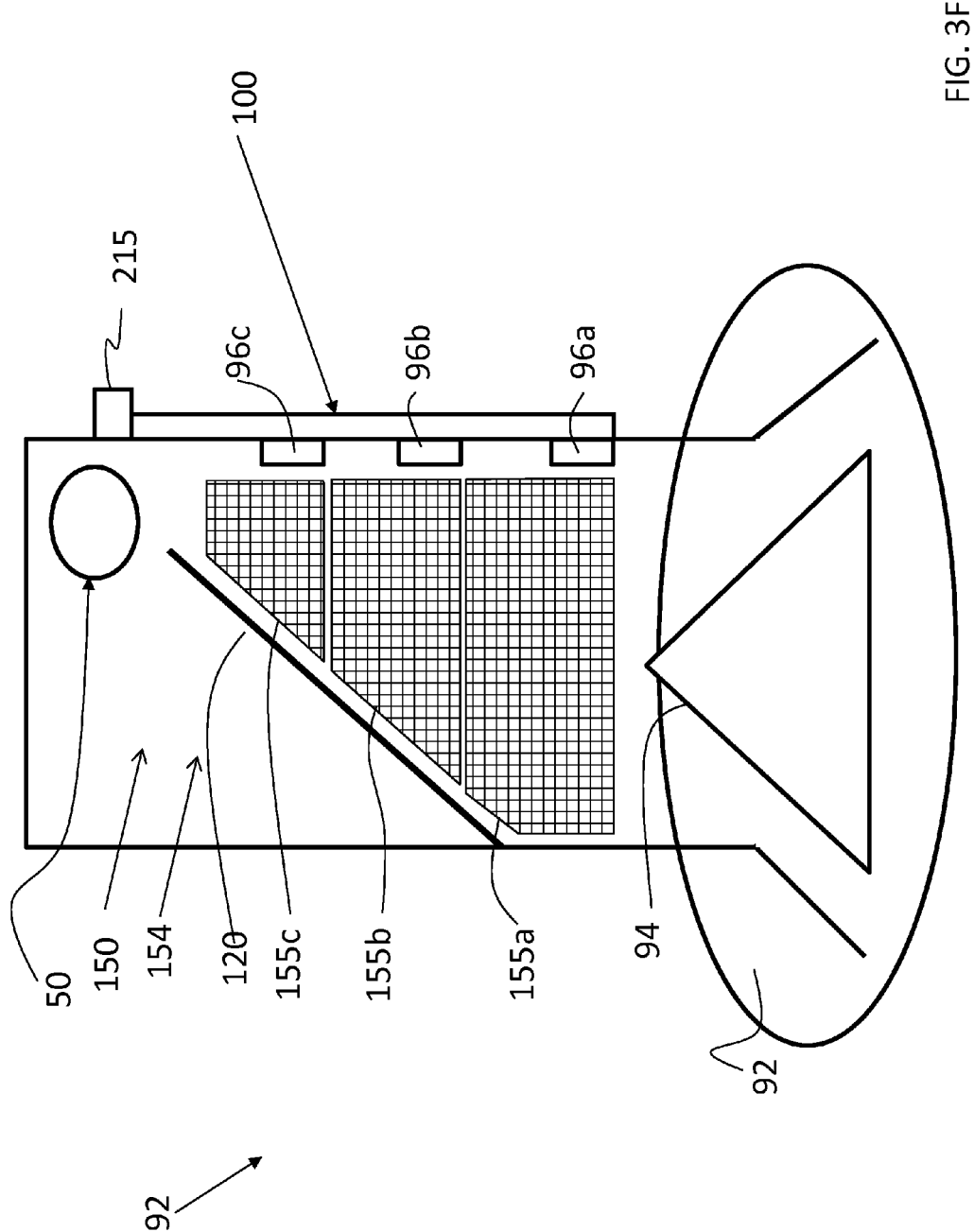

FIG. 3D is schematic block diagram and FIG. 3E is a non-limiting illustrative depiction of a master feed dispenser 91 according to an optional embodiment of the present invention that functions in a similar way to the dispensers described above. Master feed dispenser 91 is provided for controlling the meal size provided to livestock for example poultry, comprising one feed volume and feed delivery frequency actuating device 100 that is capable of controlling feed volume delivery, relative to a static, angled internal wall 120, as shown.

Wall 120 is positioned at an angle within the down pipe 150 therein diagonally bisecting the available feed volume within down pipe 150, defining a feed volume controllable area/zone 155 and a non-active zone closed area 154. Most preferably feed volume controllable zone 155 provides a gradually decreasing feed volume (top to bottom) along the slope of wall 120, such that the top of wall 120 essentially the full width of down pipe 150, is available for feed allowing for the largest feed volume, while the bottom of wall 120 defines the smallest feed volume made available for dispensing.

Most preferably feed actuating device 100 comprises actuator 110, feed volume drive shaft 112, vertical drive shaft switch 114, vertical drive feed volume indicator 116 and vertical drive slot 118. Most preferably dispenser 91 is provided with feed actuating device 100 configured to control feed volume by moving vertically along a portion of the length of dispenser 91. Most preferably, feed volume is controlled by displacing feed drive shaft 112 vertically (up or down) as shown by arrows 112*v*. For example when drive shaft 112 is up relative to inclining wall 120, at the top of wall 120, a maximal (largest) feed volume is made available to dish 92; similarly, when drive shaft 112 is down relative to inclining wall 120, at the bottom of wall 120, a minimal (smallest) feed volume is made available to dish 92.

Vertical drive shaft 112 is controlled with actuator 110 and vertical drive shaft switch 114, to displace drive shaft 112 up or down vertical drive slot 118. Optionally drive slot 118 is graduated comprising a plurality of stop location along its length opposite wall 120 to define a plurality of feed volume sizes. Most preferably vertical drive slot 118 comprise at least 3 or more stop location about its length, therein providing a large, medium and small feed volume size.

Actuator 110 optionally and most preferably comprises a gear (not shown) to control the vertical movement of drive shaft 112 and switch 114, as shown with arrows 112*v*. Optionally actuator 110 may be provided in the form of a motor, actuator or the like that may controllably manipulate the movement of drive shaft 112 in the direction depicted by arrows 112*v*. Optionally actuator 110 may be controlled via wired, wireless, cellular means. Optionally actuator 110 may be controlled via communication module 215.

Most preferably actuator 110 provides for controlling vertical drive shaft switch 114 to allow for vertical movement about slot 118. For example, when switch 114 is open is allows shaft 112 to move from a first position to a second position along slot 118, when second position is reached switch 114 is closed locking shaft 112 into place at a second position along slot 112.

Most preferably the feed level may be indicated with level indication 116 where its position along slot 118 reveals the feed volume size. For example if indicator 116 is about the upper portion of slot 118 the feed volume size is large, if indicator 116 is about the lower portion of slot 118 the feed volume size is small.

Optionally drive shaft 112 may be manually manipulated with indicator 116 to move up or down slot 118.

Most preferably dispenser 91 is provided with a communication module 215 (described below with reference to FIGS. 4B to 6A) for communicating parameters relating to the functioning of switch 114, the position of drive shaft 112 along slot 118 or similar parameters that may be communicated to processing centers for example including but not limited to a processor, computer, data processor 220 (described below with reference to FIGS. 4B to 6A), controller 210 (described below with reference to FIGS. 4B to 6A), or the like. For example, communication module 215 may communicate to processor 210 each time switch 114 is toggled from an open to closed position, or from closed to open, or alternatively the length of time it is open and/or closed in order to correlate the feed activity at plate 92 of dispenser 91, for further analysis and control.

Optionally sensor 96, optionally and preferably provided in the form of a level sensor and/or a volume sensor, is provided to time and activate food delivery into plate 92, by activating feed delivery through infrastructure 50, along a production line 50*a* or 50*b* or 50*c*. For example as feed is consumed by poultry 10 the feed level gradually drops to a level that is below sensor 96 causing a trigger. Most preferably, sensor 96 then activates infrastructure 50 to circulate feed to production lines 50*a*, 50*b*, and 50*c* thus delivering feed into drop zone 150, and more specifically zone 152.

Sensor 96 may optionally be provided in the form a level sensor as shown, volume sensor and/or weight sensor, or the like. Optionally the sensor may be based on at least one or more sensor technology for example including but not limited to acoustic, optical, piezoelectric, mechanical, capacitance, magnetic, RF, MEMS or the like technology sensor technology for determining weight and/or volume and/or level of a substance.

Dispenser 91 may, for example, be utilized to control the feed volume and frequency dispensed to a line. For example if dispenser 91 was installed at the end of line 50*a* (in FIG. 1, instead of 90*m* as shown), such that if controller 210 in communication with communication module 215 determines that dispenser 91 is not sufficiently frequented by livestock as there is no active change in the feed volume, controller 210 may signal to feed control device 100 via communication module 215 to decrease the feed volume so as to increase the feed frequency at dispenser 91 and thereby all of line 50*a*. Accordingly the feed volume is preferably decreased by manipulating drive shaft 112 down slot 118 via switch 114, relative to a wall 120, until it reaches a minimal feed level of slot 118 at the bottom of wall 120, therefore dispensing smaller volume feed at higher frequency to urge and/or attract livestock to dispenser 91 and line 50*a* more frequently, therein increasing their metabolism, improving their general health and most preferably improving the feed conversion ratio FCR. FIG. 3E is schematic block diagram of a master feed dispenser 92 according to an optional embodiment of the present invention that functions in a similar way to the dispensers described above. Master feed dispenser 92 is provided for controlling the meal size provided to livestock for example poultry, comprising one feed volume and feed delivery frequency actuating device 100 that is capable of controlling feed volume delivery, relative to a static, angled internal wall 120, as shown.

Wall 120 is positioned at an angle within the down pipe 150 therein diagonally bisecting the available feed volume within down pipe 150. Most preferably wall 120 provides a gradually increasing feed volume (top to bottom) such that at the bottom of wall 120 essentially the full width of down pipe 150 is available for feed allowing for the largest feed volume, while the top of wall 120 defines the smallest feed volume made available for dispensing.

Most preferably feed actuating device 100 comprises a plurality of sensors. Optionally the plurality of sensors may consist of 3 sensors 96*a*, 96*b*, and 96*c* positioned at varying heights in pipe 150 such that each sensor essentially detects different volumes of feed; Sensor 96*a* detects volume defined by area 155*a*; sensor 96*b* detects volume define by area 155*b*; and sensor 96*c* detects volume defined by area 155*c*. Sensors 96*a*, 96*b*, and 96*c* optionally and preferably are provided in the form of a level sensor and/or a volume sensor, to time and activate food delivery into plate 92, by activating feed delivery according to an algorithm performed by the previously described data processor, through infrastructure 50, along a production line 50*a* or 50*b* or 50*c*.

Optionally and preferably actuating device 100 is operative to activate only one sensor at any given time. For example as feed is consumed by poultry 10 the feed level gradually drops to a level that is below the active sensor 96*a*, or 96*b*, or 96*c* causing a trigger. Most preferably, the active sensor 96*a*, or 96b, or 96c then activates infrastructure 50 to circulate feed to production lines 50a, 50b, and 50c thus delivering feed into drop zone 150, and more specifically zone 152.

This arrangement results in different feed volumes and resultant feed frequencies depending on the active sensor. For example, assuming a constant consumption rate of feed by a fixed number of animals such as poultry able to feed simultaneously from feed dispenser, sensor 96a detects the largest volume defined by area 155a requiring less frequent but longer activation of feed delivery through infrastructure 50. Sensor 96c detects a smaller volume defined by area 155c requiring more frequent but shorter activation of feed delivery through infrastructure 50.

A similar result may be obtained by making the feed area larger to permit more animals to feed simultaneously, optionally by retaining the same volume of feed delivery but with more rapid frequency of feeding.

Sensors 96a, 96b, and 96c may optionally be provided in the form a level sensor as shown, volume sensor and/or weight sensor, or the like. Optionally the sensors may be based on at least one or more sensor technology for example including but not limited to acoustic, optical, piezoelectric, mechanical, capacitance, magnetic, RF, MEMS or the like technology sensor technology for determining weight and/or volume and/or level of a substance.

Most preferably dispenser 92 is provided with a communication module 215 for communicating triggers from sensors 96a, 96b, and 96c to processing centers and/or activating the sensor that should act as the active sensor via actuating device 100 based on communication from processing centers for example including but not limited to a processor, computer, data processor 220, controller 210, or the like.

Dispenser 92 may, for example, be utilized to control the feed volume and frequency dispensed to a line. For example if dispenser 92 was installed at the end of line 50a (in FIG. 1, instead of 90m as shown), such that if controller 210 in communication with communication module 215 determines that dispenser 92 is not sufficiently frequented by livestock as there is no active change in the feed volume, controller 210 may signal to actuating device 100 via communication module 215 to activate sensor 96c so as to increase the feed frequency while decreasing the feed volume at dispenser 92 and thereby all of line 50a in order to urge and/or attract livestock to dispenser 92 and line 50a more frequently, therein increasing their metabolism, improving their general health and most preferably improving the feed conversion ratio FCR.

FIG. 4A depicts an apparatus and/or kit 200 according to an optional embodiment of the present invention for retrofitting an existing and/or working automatic livestock feeder system 70, as described with respect to FIG. 1, with at least one or more feed sizing actuating device 100 according to an optional embodiment of the present invention. Optionally apparatus and/or kit 200 comprise a feed actuating device 100 (as described in FIG. 3A-3E) and at least one or more sensors for example including but not limited to a volume sensor and/or weight sensor and/or level sensor or the like sensor for sensing the feed level within feed dispenser 90/91/92. Optionally and preferably actuating device 100 is associated with at least one feed dispenser 90/91/92, optionally a slave dispenser 90s and more preferably but optionally a master feed dispenser 90m. Most preferably actuating device 100 is associated, installed and/or otherwise coupled with a master feed dispenser 90m associated in at least one and most preferably all production lines 50a, 50b, and 50c associated with feed supply infrastructure 50.

Figure 4B:
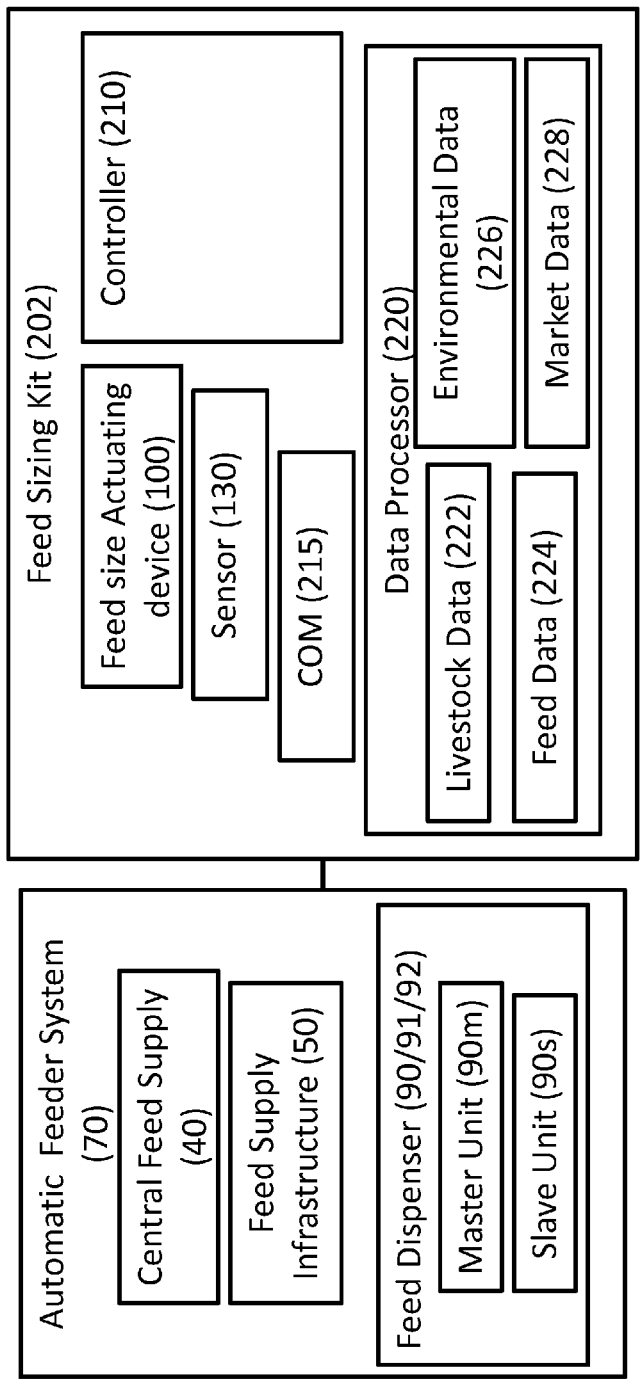

FIG. 4B depicts an apparatus and/or kit 202 according to an optional embodiment of the present invention for retrofitting an existing and/or working automatic livestock feeder system 70, as described with respect to FIG. 1, with at least one or more feed sizing actuating devices 100 according to an optional embodiment of the present invention. Optionally apparatus and/or kit 202 comprise an automatic feed actuating device 100, controller 210, sensor 130, communication module 215, and data processor module 220.

Optionally and preferably a controller 210 is provided to control the activity of automatic feed actuating device 100 and integrate its activity with respect to sensor module 130 and data processor module 220. For example, controller 210 may activate device 100 based on sensed parameters associated with sensor module 130 while the sensed data is processed with data processor module 220, which is communicated with communication module 215.

Optionally sensor module 130 may comprises at least one or more sensors associated with the feed dispenser 90/91/92 for example including but not limited to feed volume sensor, feed level sensor or weight sensor levels. Optionally sensor module 130 may further comprise a temperature sensor, motion sensor, or similar sensor (not shown) that may be disposed within livestock housing 60, to determine livestock behavior and/or parameters. For example, a motion sensor may optionally be placed near a production line 50a-c to determine the level of activity about the production line so as to determine, most preferably with controller 210 and data processing module 220, how to adjust feed volume and feed frequency with device 100 so as to optimize the overall functionality of the production line. As a further example, a temperature or humidity or light sensor, or some combination (not shown) may optionally be placed within livestock housing 60 to determine the climate within the housing 60 so as to determine, most preferably with controller 210 and data processor 220, whether changes in feed consumption are related to climate changes in the housing 60 and further to optimize climate conditions based on gathered feeding data. Optionally, it is possible to optimize feeding based on light and climate changes, or alternatively to control the environment according to the feeding patterns (for example, to control when to turn the lights on and off according to feeding times).

Optionally communication module 215 may provide wireless, wired, cellular, radio, optical communication between controller 210, actuating device 100, sensor module 130 and data processing module 220.

Optionally communication module 215 may further provide communication with automatic feeder system 70.

Optionally data processor module 220 may comprise at least one and more preferably a plurality of data repositories and/or parameter, and provide for data analysis, data abstraction and decision making capabilities with respect to the available data and sensed events optionally and preferably sensed with at least one sensor comprising sensor module 130. For example, daily feed consumption patterns, based on operating times collected from different feed lines, may be stored to build up a history of expected feeding behavior. This history can then be analyzed to highlight changes in feed consumption. For example, if feeding levels drop below average previously recorded consumption this could be an indicator of flock disease. It could also indicate a change in the number of animals (for example, if some are sold early), which would cause a drop in general population and a drop in demand for food. A drop in food demand can also be caused in a malfunction of the climate control or light control systems, which would also be detectable visible by continuously monitoring flock feeding patterns.

Conversely, if feeding levels increase above average previously recorded levels then this could be an indicator of improved environmental conditions, or alternatively of a reduction in feed quality and calories—causing the growing animals to consume more feed than with high calorie food.

Data processor module 220 may obtain data with respect to and/or comprise a plurality of data repositories, for example including but not limited to livestock data 222, feed data 224, environmental data 226, market data 228, or the like.

Optionally livestock data 222 may for example include but is not limited to livestock growth charts, health history, age, livestock welfare data, vitality data, metabolic data, timing data or the like data specific and associated with the livestock.

Optionally feed data 224 may for example include but is not limited to expiration date, behavior at different temperatures, quality of product, expected consumption data, real consumption data, volume, availability, stock or the like.

Optionally market data 228 may for example include but is not limited to data associated with the marketing information associated with the livestock. For example data may include, preferred market size, livestock prices, growth curves, feed prices, length of stay data or the like.

Optionally environmental data 226 may for example include any data associated with the internal environment that the livestock are exposed to or external environmental data that may affect the livestock or feed. For example environmental data may include but is not limited to weather information, outdoor temperature, indoor temperature, humidity, livestock housing specific temperature, livestock housing environmental data, housing lighting regimen, data relating to livestock circadian rhythms or the like.

Optionally communication module 215 may provide for uploading and or downloading information from the internet, a server, an intranet or the like using communication protocols.

Optionally at least one or more of controller module 210, communication module 215 and data processing module 220, sensor module 130 may be for example be realized through a device comprising a processor for example including a computer, laptop computer, PDA, smart phone, android phone, a mobile telephone, server, a dedicated device or the like.

Apparatus and/or kit 202 may optionally include actuating device 100 which may be associated with a feed dispenser 90/91/92, optionally a slave unit and more preferably a master unit, while the controller 210 and data processor 220 and communication module 215 may be a stand-alone device and/or unit or incorporated, coupled and/or otherwise associated with automatic feeder system 70, for example with wired, wireless, cellular, optical, acoustic or the like communication protocols.

Figure 5A:
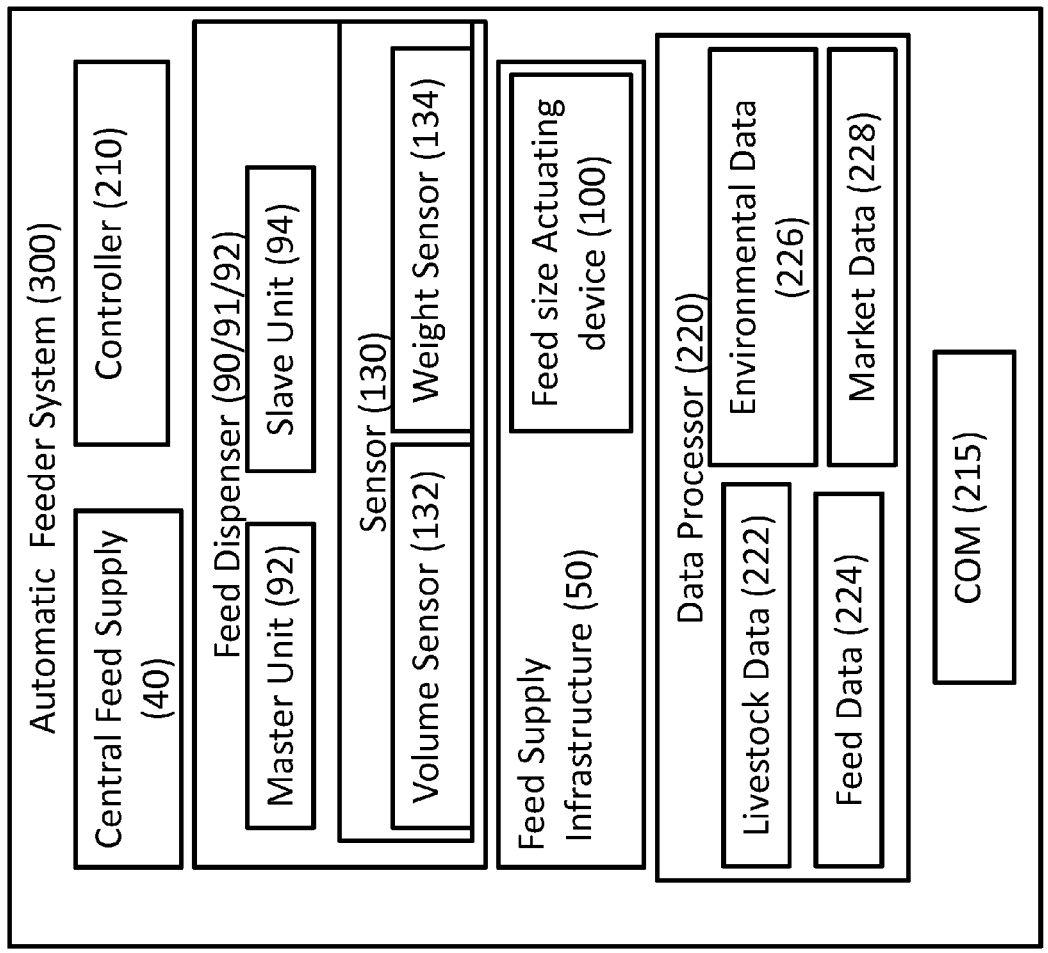
FIG. 5A-B are schematic block diagrams of optional automatic poultry feed delivery system comprising a feed volume and feed frequency device according to optional embodiments of the present invention.

FIG. 5A depicts an automatic livestock feeder system 300 according to an optional embodiment of the present invention comprising central feed supply 40, feed supply infrastructure 50, a plurality of feed dispensers 90, feed size and frequency actuating device 100, data processor module 220, communication module 215, sensors module 130 and controller module 210.

System 300 optionally comprises sensor module 130 that is incorporated with and/or associated with or at least one or more feed dispensers 90, optionally at least one master dispenser 90m or slave dispenser 90s.

Figure 2B:
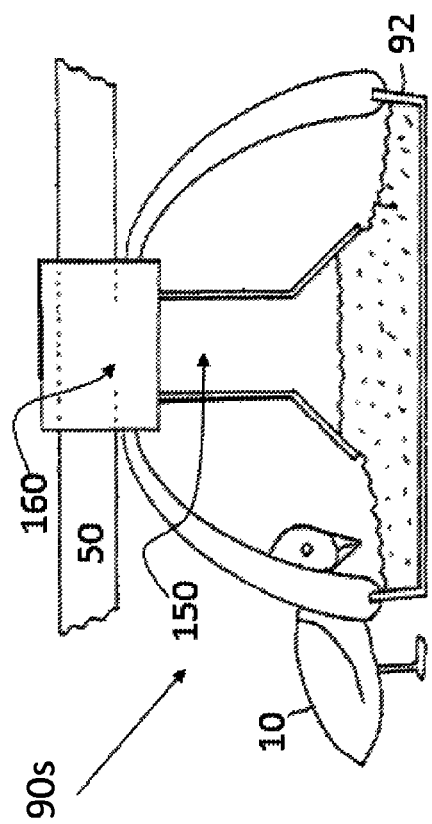
FIG. 2A-C are schematic illustrative diagrams of prior art poultry feed dispenser as part of an automatic poultry feeder delivery system.
Figure 2A:
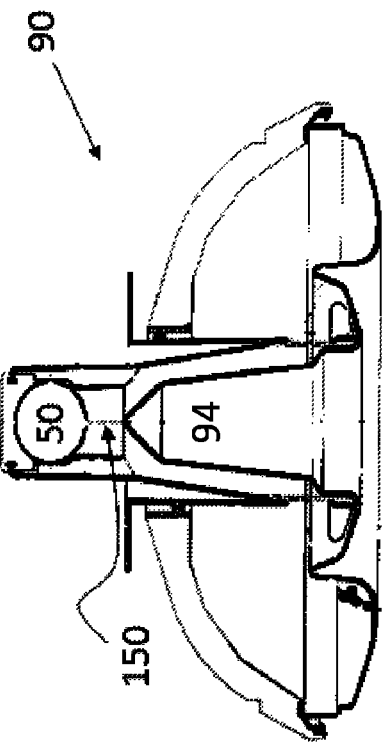
Figure 2C:
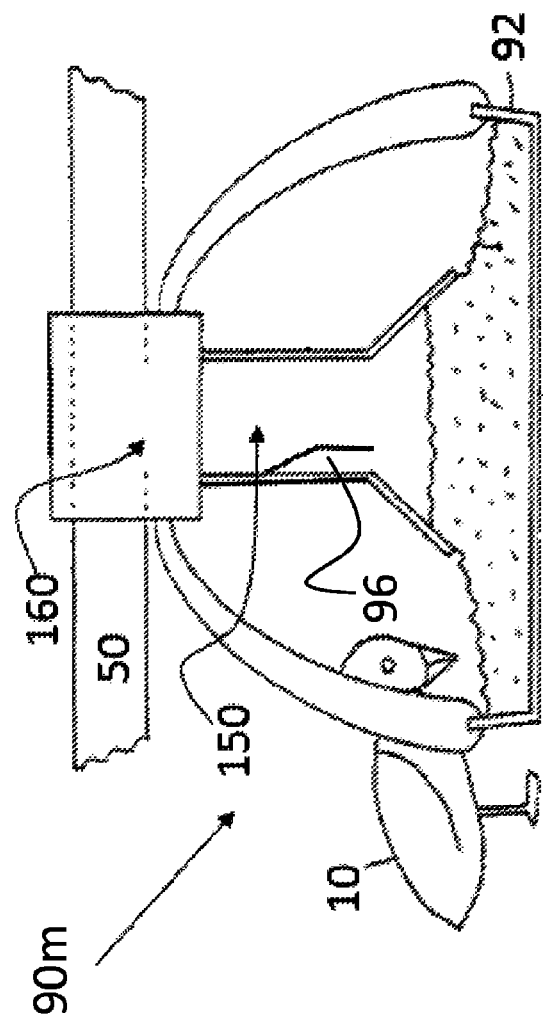

Optionally and preferably feed supply infrastructure 50 may directly or indirectly be coupled, connected to, associated with and or otherwise incorporated with a feed actuation device 100, optionally at feed outlet point 160 (FIG. 2B). For example feed supply actuating device 100 may be incorporated into the piping utilized as part of the feed supply infrastructure 50 at feed outlet 160. Optionally feed supply infrastructure 50 may comprise at least one and more preferably a plurality of individual production lines and most preferably at least three or more production lines.

Figure 5B:
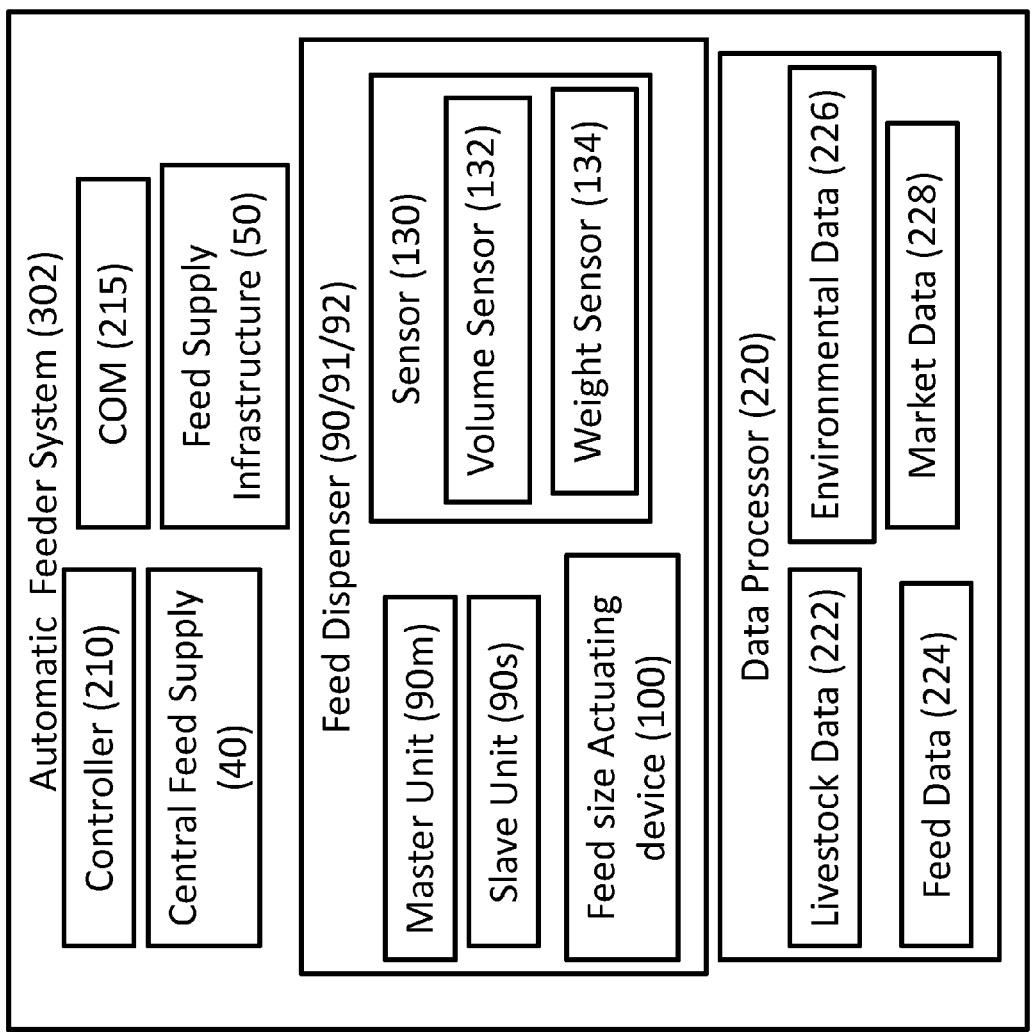

FIG. 5B depicts an optional embodiment of the present invention for an automatic livestock feeder system 302 comprising central feed supply 40, feed supply infrastructure 50, a plurality of feed dispensers 90, feed size and frequency actuating device 100, data processor module 220, communication module 215, sensors module 130 and controller module 210.

System 302 may optionally and preferably provide for an actuating device 100, as previously described, that is associated with a feed dispenser 90/91/92 and sensor module 130.

Optionally at least one or more actuating device 100 may be installed, integrated or otherwise coupled with at least one of feed dispenser 90/91/92 for example including but not limited to a master feed dispenser 90m and/or a slave feed dispenser 90s.

Optionally at least one or more actuating device 100 may be installed, integrated or otherwise coupled with at least one master feed dispenser 90m and a plurality of slave feed dispensers 90s.

Optionally feed supply infrastructure 50 may comprise at least one and more preferably a plurality of individual production lines and most preferably at least two or more production lines, of which three are shown for the purpose of illustration only and without any intention of being limiting: 50a, 50b and 50c.

Optionally at least one or more of actuating device 100 may be installed, integrated or otherwise coupled with at least one or more master feed dispensers 90m per production line 50a, 50b, 50c within the automatic feed dispensing system 302.

Optionally at least one actuating device 100 may be installed, integrated or otherwise coupled with at least one or more production line 50a, 50b, 50c of the automatic feed dispensing system 302 through at least one feed dispenser 90/91/92.

Optionally at least one or more actuating device 100 may be installed, integrated or otherwise coupled with each production line of the automatic feed dispensing system 302 through at least one feed dispenser 90/91/92.

Optionally at least one or more actuating device 100 may be installed, integrated or otherwise coupled with each production line of the automatic feed dispensing system 302 within one master feed dispenser 90m and a plurality of slave feed dispensers 90s.

Optionally at least one or more actuating device 100 may be installed, integrated or otherwise coupled with all feed dispensers 90 associated with each production line of the automatic feed dispensing system 302.

Optionally at least one or more actuating device 100 may be installed, integrated or otherwise coupled with at least one or more master feed dispenser 90m per production line within the automatic feed dispensing system 302, therein preferably producing independently controllable sub-production lines segments within a production line. Optionally sub-production lines within system 302 may be provided such that a sub-group utilizing system 302 is provided with its own customized sub-production line based on individual control of feed delivery frequency and feed volume with device 100 according to the present invention.

For example a flock comprising male and female birds of two different poultry breeds for example, fryers and broilers, may utilize system 302 according to an optional embodiment of the present invention by providing individual sub-production lines for each poultry type grown with system 302. A first production line may be set up for the fryers and a second broiler. Within each first and second production line two sub production lines may be set up for the male and female members. Most preferably each production line and sub-production line is provided with customizable feed volume and feed frequency. For example a sub-production line of broiler male members may be provided with a low frequency feed delivery and a large volume feed at each delivery; a sub-production line of broiler female members may be provided with a medium frequency feed delivery and a medium volume feed at each delivery; a sub-production line of fryer male members may be provided with a high frequency feed delivery and a medium volume feed at each delivery; a sub-production line of fryer female members may be provided with high frequency feed delivery and a small volume feed at each delivery.

Figure 6A:
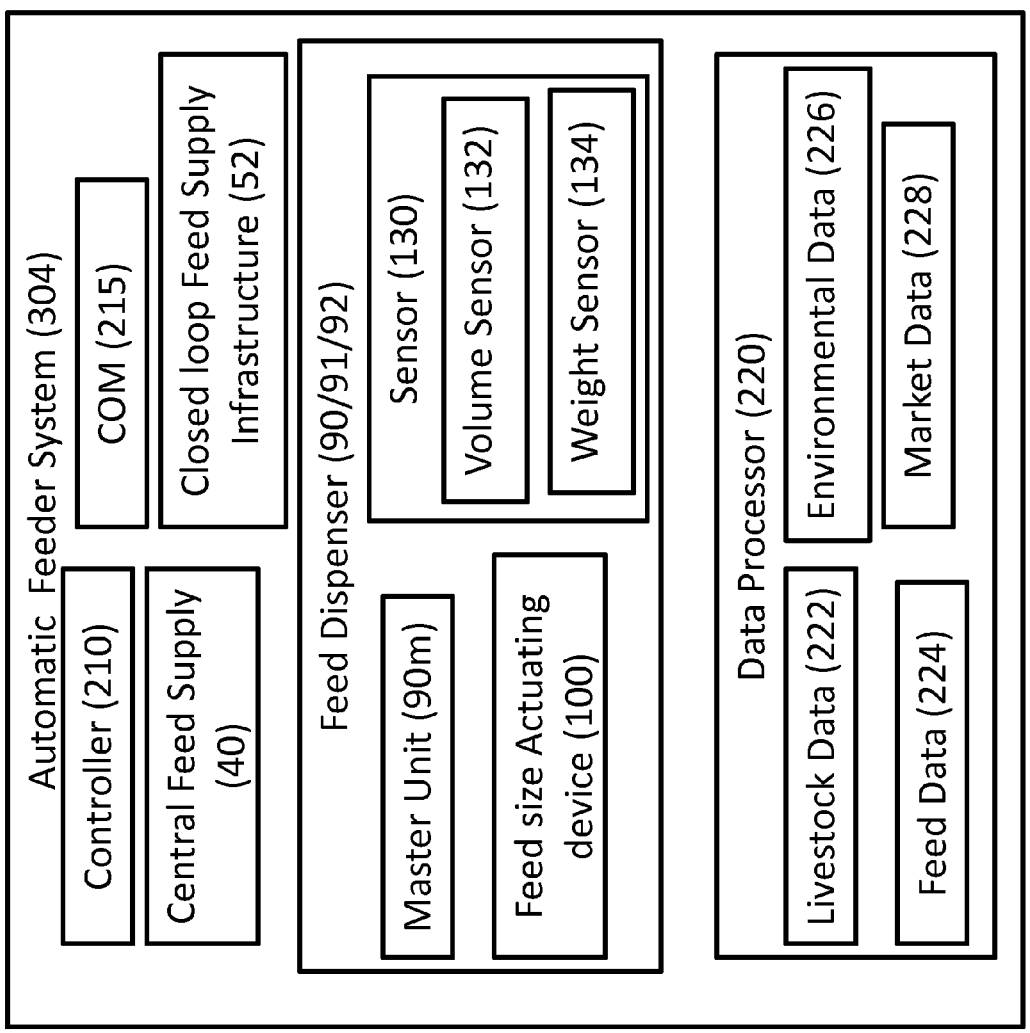
FIG. 6A-B are schematic block diagrams of an optional closed loop automatic poultry feed delivery system comprising a feed volume and feed frequency device according to optional embodiments of the present invention.
Figure 6B:
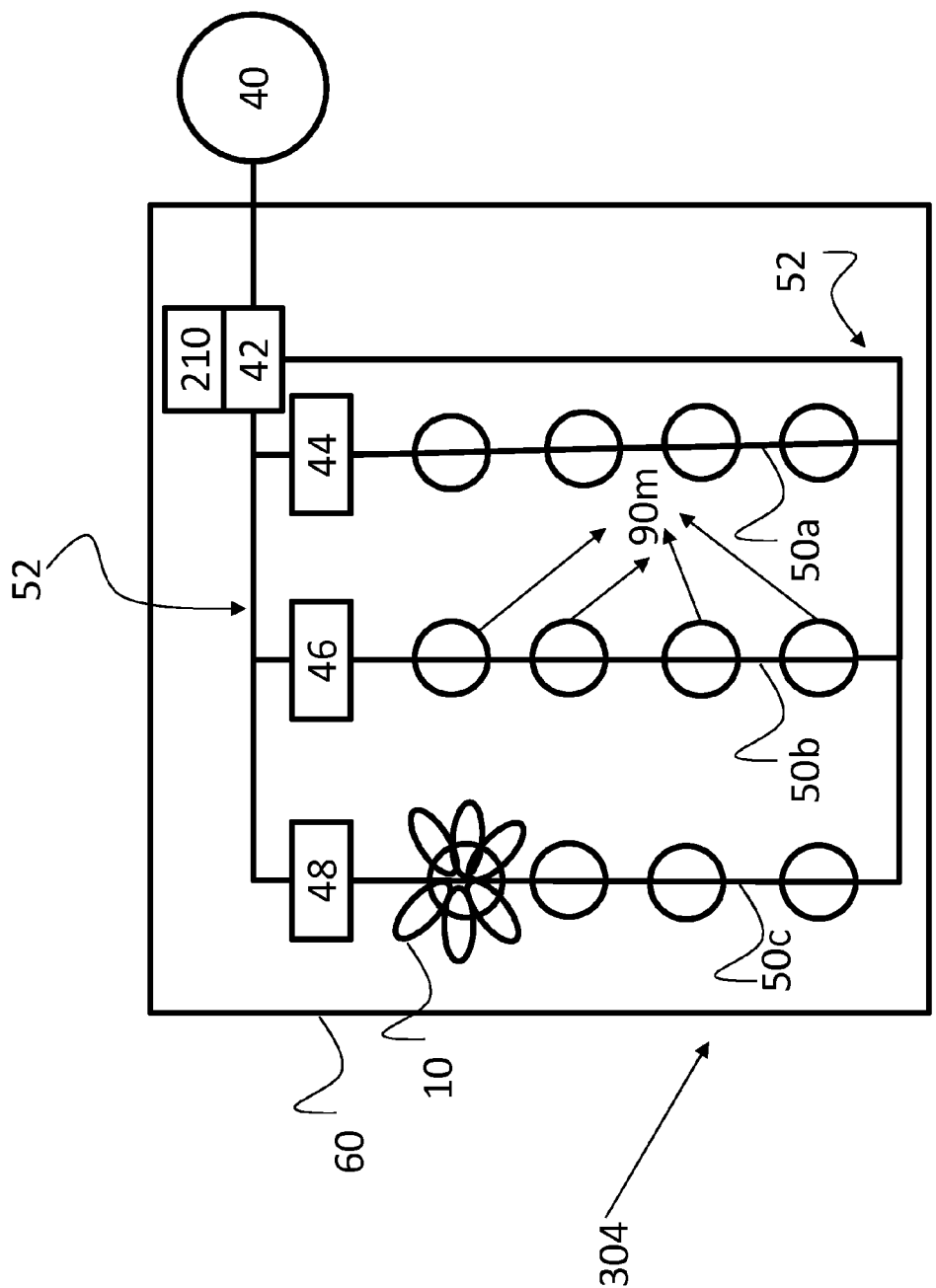

FIGS. 6A and 6B depict an optional embodiment of the present invention for an automatic livestock feeder system 304 comprising central feed supply 40, a closed loop feed supply infrastructure 52, a plurality of master feed dispensers 90m, feed size and frequency actuating device 100, data processor module 220, communication module 215, sensors module 130 and controller module 210. FIG. 6A provides a schematic block diagram of system 304 while FIG. 6B provides an illustrative schematic floor plan of system 304 according to an optional embodiment of the present invention, for example comprising three livestock production lines 50a, 50b, and 50c.

System 304 preferably provides for a closed loop feed supply infrastructure so as to minimize feed waste while providing each feed dispenser with master control 90m, for example to provide the entire livestock flock with individualized control over their own dispenser plate 92.

Figure 7:
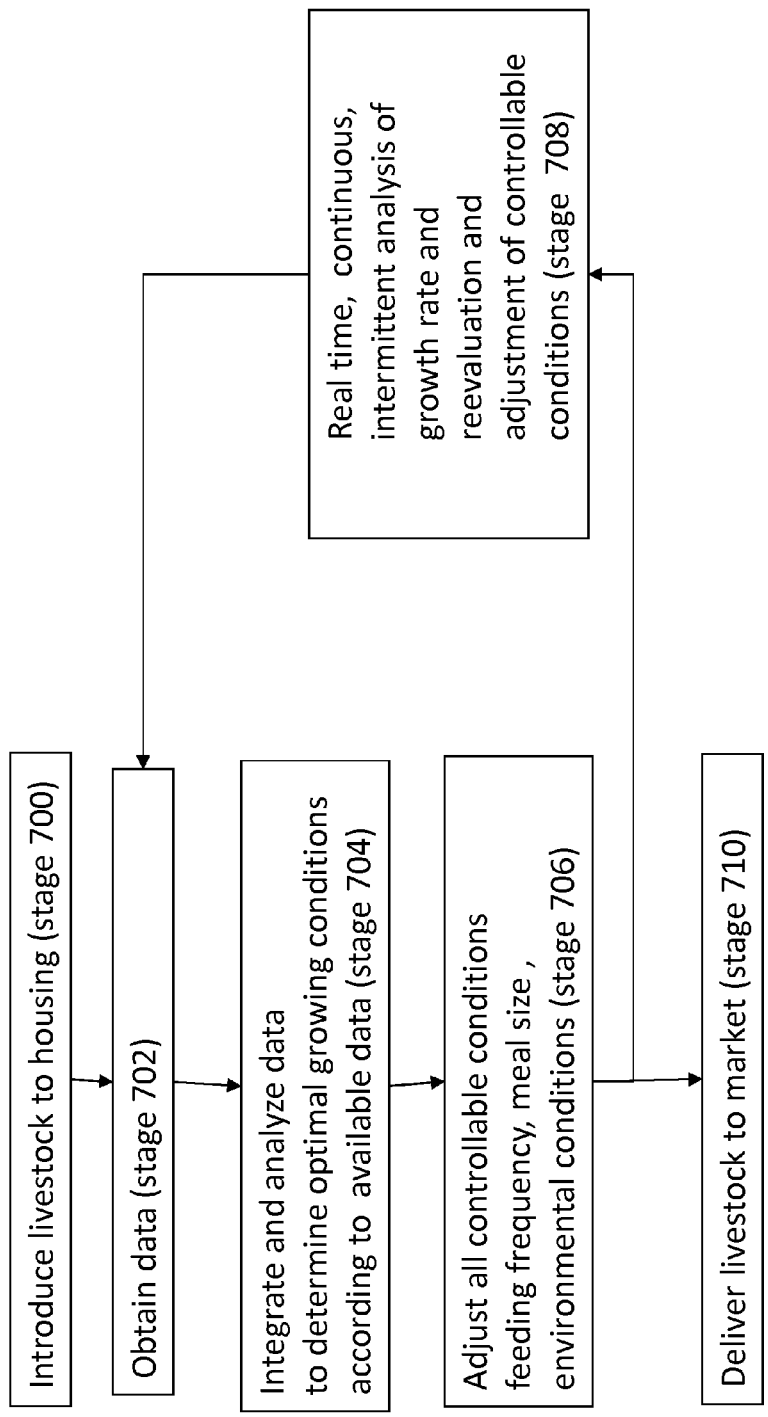
FIG. 7 is an optional method according to the present invention for improving livestock yields.

FIG. 7 shows a flowchart of an exemplary method according to an optional embodiment of the present invention for optimizing livestock yields and parameters by utilizing a device and system for controlling livestock feed volume and feed delivery frequency. Most preferably livestock feed volume and feed delivery frequency are controlled in relation to at least one and more preferably a plurality of parameters for example including but not limited to environmental parameters, for example, enclosure climate, livestock parameters, market parameters, feed parameters, livestock behavioral parameters, livestock psychological parameters, livestock eating demand, livestock drinking, livestock cleaning behavior, livestock social activity, pavlovian behavior, flock migration and/or movement within housing, flock migration and/or movement relative to productions lines, eating demand in response to the system, imprinting behavior in response to the system, pavlovian behavior with respect to the system or the like alone or in any combination thereof.

In stage 700, livestock are introduced to the livestock housing 60. Next in stage 702 all data associated with data processing module 220 is uploaded for example with communication module 215, searched for and or otherwise attained. For example data associated with the livestock, environment, housing, the grower, market data, weather, and/or feed data are obtained and associated with data processor 220 and/or controller 210. For example livestock data may for example include the genotype, livestock growth chart, number of member in the flock, and expected weather forecast over the growing period.

Next in stage 704, the data obtained or otherwise gathered in stage 702 is processed to integrate all aspects of the growing process, so as to optimize the growing process and to optimize livestock yields based on a number of parameter. Optionally and preferably data processing may be performed by controller 210 and/or data processing module 220. Most preferably, all available data is integrated to optimize at least one or more parameters that may optionally be selected by a user. For example a user may select to optimize the length of stay to reduce the stay from 42 days to 37 days. For example a user may elect to optimize flock size and weight, or the like. Most preferably all controllable parameters for example feed meal size and feed delivery frequency are determined in order to optimize at least one or more user selected parameters.

Next in stage 706, all adjustable parameters are adjusted accordingly to optimize livestock yield and/or uniformity. Most preferably the feed supply system is adjusted to optimize feed volume and frequency of feed delivery to provide continuous and/or constant feed demand about all production lines (50a, 50b, and 50c) and most preferably to increase livestock metabolism, welfare, FCR and FCE.

Optionally and preferably individual production lines 50a, 50b, and 50c may be individually controlled so as to provide optimal conditions for each of the production lines and provide flock growth rate uniformity by accounting for flock member variability while optimizing overall flock uniformity and flock growth rate. For example production line 50a may have a high frequency small feed volume delivery accounting for smaller birds requiring continuous feeding; while production line 50b may have a medium frequency feed delivery and mediums feed volume delivered accounting for the average birds within the flock; while production line 50c may have low frequency feed delivery and large feed volume delivered so as to meet the variable needs of individual flock members within the livestock housing.

Most preferably feed volume and feed frequency may be controlled about production lines 50a, 50b, and 50c, by coordinating the function of dispensers, for example dispenser 91, and data available via data processor module 220. Optionally and most preferably operation of dispenser 91 may be controlled by integrating a plurality of parameters relating to the livestock and dispensers for example including but not limited to livestock growth curve/potential, livestock intended growth stage, line specific distributors 44, 46 and 48 on-time, dispenser actuator (110 of FIGS. 3A to 3D) on-time, drive shaft switch (114 of FIGS. 3A to 3D) on time, or the like.

Dispenser 91 may, for example, be utilized to control the feed volume and frequency dispensed to a line 50a, 50b, or 50c such that if controller 210, based on data available through processor module 220, and in communication with communication module 215 and dispenser 91 determines that livestock are not adequately utilizing feed available at line 50a, controller 210 may signal to feed actuator device 100 via communication module 215 to decrease the feed volume so as to increase the feed frequency at dispenser 91 and thereby the feed frequency for all of line 50a. Accordingly the feed volume is preferably decreased by activating actuator 110 to manipulate drive shaft 112 down slot 118 via switch 114, relative to a wall 120, until it reaches a minimal feed level of slot 118 at the bottom of wall 120, therefore dispensing smaller volume feed at higher frequency to urge and/or attract livestock to dispenser 91 and line 50a more frequently therein increasing their metabolism, improving their general health and most preferably improving the feed conversion ratio (FCR).

Optionally the noise resultant from motor activation of line specific distributors 44, 46 and 48 urges livestock to a feeding plate therein leveraging the livestock's imprinting and/or pavlovian response behavior to feed in response to or when hearing the motor activation at a particular dispenser. Further, the motor activation of line specific distributors 44, 46 and 48 may optionally be preceded or followed by an audible cue such as a series of beeps that will likewise be associated by the flock with the onset of feed and feeding time. It can be also companied by light effects generated by controller 220.

Optionally and most preferably controller 210 and data processor module 220 determine the need to change feed volume and/or frequency of a particular line, for example 50a, 50b, or 50c, by comparing the relative time switch 114 is in the open position in each of the lines 50a, 50b, or 50c in order to regulate the activity of actuator 110. For example, assume 114Ta represents the time that switch 114 is open in line 50a, 114Tb represents the time that switch 114 is open in line 50b and 114Tc represents the time that switch 114 is open in line 50c. Controller 210 manipulates the activity of actuator 110 according to the following rationale:

If (114Tc<114Ta) or (114Tc<114Tb) then activate actuator 110 in line 50c to manipulate drive shaft 112 down one level along slot 118;

If (114Tb<114Ta) or (114Tb<114Tc) then activate actuator 110 in line 50b to manipulate drive shaft 112 down one level along slot 118;

If (114Ta<114Tb) or (114Ta<114Tc) then activate actuator 110 in line 50a to manipulate drive shaft 112 down one level along slot 118.

Most preferably this control scheme brings about equilibrium across all lines 50a, 50b, and 50c thereby increasing overall flock welfare and improving the feed conversion ratio FCR for all lines.

Optionally and preferably controller 210 and data processor module 220 may further control functioning of a production line, for example 50a, 50b, or 50c, by comparing the relative activation time and/or run time and/or 'on time' of actuator 110, to a default time threshold defining alarm state, upon which an alarm or the like indicator will be automatically communicated to controller 210 or user. Most preferably the time threshold and resultant activity may be user defined. Optionally and preferably the threshold time is 50 minutes. For example, if actuator 110 continuously runs for a pre-defined period of time, for example more that 50 minutes or as defined by a user, an alarm will be sent to a user or controller to disable the functioning actuator 110.

For example, a particular production line, 50c, runs past the defined time threshold, for example 50 minutes, triggering an alarm or similar indicator that is communicated to controller 210 and/or user.

Optionally and preferably controller 210 and data processor module 220 may further control functioning of a production line, for example 50a, 50b, or 50c, by defining relative activation time limits a dispenser, for example dispenser 91, is activated at a particular feed volume. Optionally and preferably a user may set time limits for example, minimum and/or maximum and/or interval, and/or net time, feed volume may remain at a particular feed volume before the feed volume is adjusted to a default, preferably user defined, feed volume. For example, a production line may deliver a particular feed volume for up to 6 hours without changing before controller 210 changes it to a default value.

Next in stage 708 continuous monitoring and feedback control is provided most preferably by continuously gathering data and adjusting according to optimizable conditions as determined by the user. Optionally the monitoring and relative adjustments may be done in real time.

Lastly in stage 710 the flock is delivered to market. Optionally and preferably flock is delivered in a substantially uniform size so as to meet market needs for size uniformity due to other automatic livestock handing processes for example slaughtering.

Examples

The below tables depict results while utilizing the device and method of the present invention where, a manual actuating device 100 as described in FIG. 3A was placed in three different poultry housings 60 with automatic feeding device 70 as described in FIG. 1.

TABLE 1

Large flock chicken broilers

| Large Coop | Control Coop | Test Coop | Percentage Difference | Equivalent Monetary Value |
|---|---|---|---|---|
| Avg. Weight | 1,871 g | 2,039 g | +9% (168 g) | 45,000 NIS |
| Livestock death | 2,252 | 1,905 | −18% (347 animals) | 4,247 NIS |
| Livestock feed (Tons) | 190,121 | 181,585 | −5% (8,536 Ton) | 18,000 NIS |
| Totals | | | | 67,247 NIS |

Table 1 reveals that the device, system and method of the present application lead to an increase in profit of about 2%. Other savings have also been reported with respect to reduced energy bills, reduced livestock housing heating, cleaning, upkeep, gas for powering infrastructure 50, human resources have all shown vast improvement in terms of savings.

Statistical analysis further show that there was an increase in production line output where birds increased their weight gain by about 9% while reducing the mortality rate of the coop by 18%, all the while saving 5% of the used feed costs. Furthermore it was observed that birds reached market size 4 days earlier than expected.

TABLE 2

Small flock chicken broilers

| Small Coop | Control Coop | Test Coop | Percentage Difference | Equivalent Monetary Value |
|---|---|---|---|---|
| Avg. Weight | 2,250 g | 2,430 g | +8% (180 g per bird, 5.4 tones coop) | 32,400 NIS |
| Livestock death | 1,423 | 1,140 | −24% (347 animals) | 4,126 NIS |
| Livestock feed | 190,121 | 181,585 | −5% (8536 tone) | 18,000 NIS |
| Totals | | | | 54,526 NIS |

Table 2 reveals that the device, system and method of the present application lead to overall improved livestock yield as measured, and, for example a net profit increase of about 1.5%. Other savings have also been reported with respect to reduced energy bills, reduced livestock housing heating, cleaning, upkeep, gas for powering infrastructure 50, human resources have all shown vast improvement in terms of savings.

Further statistical analysis show that there was an increase in production line output where birds increased their weight gain by about 8% while reducing the mortality rate of the coop by 24%, all the while saving 5% of the used feed costs.

TABLE 3

| Large flock chicken broilers | | | | |
|---|---|---|---|---|
| Large Coop | Control Test Coop | Coop | Percentage Difference | Equivalent Monetary Value |
| Avg. Weight | 2,290 g | 2,421 g | +5.5% (127 g avg per bird, 5.7 tone) | 34,290 NIS |
| Livestock death | | | n/a Coop using antibiotics | |
| Livestock feed | 213,408 | 195,450 | −9% (17,958 Ton total) | 18,000 NIS |
| Totals | | | | 62,290 NIS |

Table 3 reveals that the device, system and method of the present application lead to overall improved livestock yield as measured, and, for example a net profit increase of about 3%. Some of the increased profit has been attributed to savings with respect to reduced energy bills, reduced livestock housing heating, cleaning, upkeep, gas for powering automatic infrastructure system 50; human resources have all shown vast improvement in terms of savings.

Further statistical analysis further show that there was an increase in production line output where birds increased their weight gain by about 5.5% while reducing the mortality rate of the coop by 24%, all the while saving 9% of the used feed costs. The flock reached expected goal market weight on day 41, therefore allowing the flock to reach market size 4 days earlier than scheduled.

While the invention has been described with respect to a limited number of embodiments, it will be appreciated that many variations, modifications and other applications of the invention may be made.

What is claimed is:

1. An automatic livestock feed delivery system for automatically dispensing feed to livestock, being raised within a livestock housing, the system comprising:
   a. feed supply infrastructure to convey livestock feed from a central feed supply to a plurality of feed dispensers wherein each of said feed dispensers are disposed about a feed outlet points;
   b. a feed volume and feed delivery frequency actuating device for controlling the feed volume and frequency of delivering said feed volume to livestock through said feed dispensers, wherein each of said feed dispensers receives an appropriate amount of feed according to livestock consumption of said feed; and
   c. at least one sensor selected from the group consisting of volume sensor, level sensor or weight sensor; wherein said sensor is disposed internally with said feed dispenser; and
   d. a controller for controlling said actuating device based on data obtained and processed with a data processing module and wherein said data is communicated to said controller with a communication module.

2. The system of claim 1 wherein said communication module provides for communication between said controller and said actuating device.

3. The system of claim 1 wherein said data processing module obtains and processes data including one or more of livestock data, feed data, environmental data, market data, livestock psychological data, livestock behavioral data, livestock housing data, livestock eating frequency, livestock metabolic data, and any combination thereof.

4. The system of claim 3, further comprising a feedback monitor for determining the amount of feed eaten on a historical basis.

5. The system of claim 4, further comprising an environmental sensor for providing information on the environment for the livestock in communication with said feedback monitor, wherein any changes in said environment are correlated with the amount of feed eaten on a historical or actual basis to determine whether said change increases or decreases the amount of food eaten.

6. The system of claim 5, wherein said data processing module receives one or more of feeding parameters, animal behavior parameters or both according to a predetermined goal, and wherein said data processing module further determines an amount and timing of feed to provide according to data from said environmental sensor and according to said predetermined goal.

7. The system of claim 6, wherein said predetermined goal is selected from the group consisting of reaching a predetermined maximum weight, reaching a predetermined minimum weight within a predetermined period of time or maximizing welfare of the animals.

8. The system of claim 5, wherein said environmental sensor comprises one of a temperature sensor, a humidity sensor or both.

9. The system of claim 8, further comprising a connection to a lighting system, wherein said data processor sends a command to said lighting system so as to determine when to turn lights on and off according to feeding times.

10. The system of claim 8, further comprising a connection to a lighting system, wherein said data processor receives information regarding a pattern of when lights are turned on and off, and wherein said actuator is commanded to provide feed at least partially according to said pattern.

11. The system of claim 1, further comprising a device for producing a sound upon delivery of feed by said feed supply infrastructure.

12. The system of claim 1 wherein said actuating device is associated with said feed dispenser or with said infrastructure system at feed outlet points.

13. The system of claim 1 wherein said plurality of feed dispensers are provided in the form of master feed dispensers comprising a feed level sensor and wherein said feed supply infrastructure is a closed loop system for circulating said feed.

14. The system of claim 13 wherein at least two actuating devices are associated with at least two or more individual master feed dispenser within at least one production line, providing for at least one sub-production line within said at least one production line.

15. A method for optimizing livestock yields and livestock parameters by utilizing a feed volume and feed delivery frequency actuating device within an automatic feed delivery system, the method comprising:
   a. Obtaining data selected from the group consisting of livestock data, environmental data, livestock housing data, grower data, marketing data, environmental data, weather data, feed data, livestock growth chart or any combination thereof; and
   b. Integrating and analyzing said obtained data to determine optimal growing conditions according to said available data;
   c. Adjusting controllable conditions associated with said automatic feeding system according to feeding frequency, meal size, and livestock system activation frequency, to optimize feed frequency, livestock metabolism and livestock distribution about the feed supply infrastructure within livestock housing; wherein feed frequency and feed volume are controlled in an inversely proportional manner; and d. repeating the above process until a predetermined goal is reached.

16. The method of claim 15, further comprising adjusting said automatic feeding system according to livestock housing environmental conditions.

17. The method of claim 16 wherein said adjusting controllable conditions includes:
   a. monitoring dispenser activation time about all production lines; and
   b. identifying a deficient production line having the with lowest dispenser activation time; and
   c. decreasing feed volume and increasing dispensing frequency at said deficient production line.

18. The method of claim 15, wherein said obtaining said data comprises receiving one or more of feeding parameters, animal behavior parameters or both according to said predetermined goal, and wherein said adjusting said controllable conditions further comprises determining an amount and timing of feed to provide according to said predetermined goal.

19. The method of claim 18, wherein said predetermined goal is selected from the group consisting of reaching a predetermined maximum weight, reaching a predetermined minimum weight within a predetermined period of time or maximizing welfare of the animals.

20. The method of claim 19 wherein said predetermined goal further comprises reaching a feed conversion ratio ('FCR') and feed conversion efficiency ('FCE').

* * * * *